US011812508B2

(12) United States Patent
Jin et al.

(10) Patent No.: US 11,812,508 B2
(45) Date of Patent: Nov. 7, 2023

(54) METHOD AND APPARATUS FOR REPORTING UE CAPABILITIES USING MANUFACTURER-SPECIFIC IDENTIFIER OF UE CAPABILITY IN NEXT MOBILE COMMUNICATION SYSTEMS

(71) Applicant: Samsung Electronics Co., Ltd., Suwon-si (KR)

(72) Inventors: Seungri Jin, Suwon-si (KR); Himke Van Der Velde, Middlesex (GB); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/567,763

(22) Filed: Jan. 3, 2022

(65) Prior Publication Data

US 2022/0124484 A1    Apr. 21, 2022

Related U.S. Application Data

(63) Continuation of application No. 16/863,822, filed on Apr. 30, 2020, now Pat. No. 11,218,870.

(30) Foreign Application Priority Data

May 2, 2019    (KR) .................. 10-2019-0051794

(51) Int. Cl.
*H04W 8/24* (2009.01)
*H04W 76/11* (2018.01)
(Continued)

(52) U.S. Cl.
CPC .............. *H04W 8/24* (2013.01); *H04W 76/11* (2018.02); *H04W 76/27* (2018.02); *H04W 76/30* (2018.02)

(58) Field of Classification Search
CPC ....... H04W 8/24; H04W 76/30; H04W 76/11; H04W 76/27
(Continued)

(56) References Cited

U.S. PATENT DOCUMENTS 11,212,668 B2 * 12/2021 Kim ...................... H04W 60/00
2019/0045491 A1 * 2/2019 Zhang ............... H04W 72/1289
(Continued)

FOREIGN PATENT DOCUMENTS

WO    2019/050789 A1    3/2019

OTHER PUBLICATIONS

3GPP TR 37.873 V16.0.0 (Mar. 2019) (Year: 2019).*
(Continued)

*Primary Examiner* — William Nealon

(57) ABSTRACT

A communication technique for convergence of the 5G communication system for supporting higher data transmission rate after the 4G system with IoT technologies and a system thereof. Certain embodiments may be applied to intelligent services based on the 5G communication technologies and the IoT-associated technologies (for example, smart home, smart building, smart city, smart car or connected car, health care, digital education, retail services, security and safe-associated services, etc.). A method and an apparatus which can substitute reporting UE capabilities by use of an identifier of the UE, without reporting the overall UE capabilities in a method of reporting UE's own capability.

16 Claims, 22 Drawing Sheets

(51) Int. Cl.
*H04W 76/27* (2018.01)
*H04W 76/30* (2018.01)

(58) Field of Classification Search
USPC .......................................................... 370/329
See application file for complete search history.

(56) References Cited

U.S. PATENT DOCUMENTS

| | | | | |
|---|---|---|---|---|
| 2019/0104554 | A1* | 4/2019 | Amuru | H04L 5/0007 |
| 2019/0215749 | A1* | 7/2019 | Shih | H04W 36/30 |
| 2019/0215861 | A1* | 7/2019 | Son | H04W 74/0833 |
| 2019/0239064 | A1* | 8/2019 | Stojanovski | H04W 36/0022 |
| 2019/0313239 | A1* | 10/2019 | Horn | H04W 8/20 |
| 2020/0119898 | A1* | 4/2020 | Orsino | H04W 74/0833 |
| 2020/0274657 | A1* | 8/2020 | Deenoo | H04W 76/27 |
| 2021/0168678 | A1* | 6/2021 | Deenoo | H04W 36/0085 |
| 2021/0409935 | A1* | 12/2021 | Stojanovski | H04W 8/22 |

OTHER PUBLICATIONS

European Patent Office, "Supplementary European Search Report," dated May 9, 2022, in connection with European Patent Application No. 20798521.9, 24 pages.

Huawei et al: "Test case for NR standalone UE UL carrier RRC reconfiguration Delay (section A.6.5.4)", 3GPP TSG-RAN WG4 Meeting #89, R4-1816576, Spokane, US, Nov. 12-16, 2018, 7 pages.

Intel Corporation: "Correction to the description of subcarrier spacing usage in ServingCellConfigCommon", 3GPP TSG-RAN WG2 Meeting #105bis, R2-1904459, Xi'an, China, Apr. 8-12, 2019, 5 pages.

Ericsson et al: "Update SIB1", 3GPP TSG-RAN WG5 Meeting #81, R5-187745, Spokane, US, Nov. 12-16, 2018, 9 pages.

"3rd Generation Partnership Project; Technical Specification Group Radio Access Network; NR; Radio Resource Control (RRC) protocol specification (Release 15)", 3GPP TS 38.331 V15.5.1 (Apr. 2019), 491 pages.

"3rd Generation Partnership Project; Technical Specification Group Radio Access Network; NR; Multiplexing and channel coding (Release 15)", 3GPP TS 38.212 V15.5.0 (Mar. 2019), 101 pages.

Ericsson, "Cleanup of references to L1 specifications", Change Request, 3GPP TSG-RAN2 Meeting #104, Nov. 12-16, 2018, R2-1817741, 437 pages.

Intel Corporation, "Corrections to first reconfiguration after re-establishment", Change Request, 3GPP TSG-RAN WG2 Meeting #104, Nov. 12-16, 2018, R2-1816749, 16 pages.

International Search Report dated Aug. 6, 2020 in connection with International Patent Application No. PCT/KR2020/005780, 3 pages.

* cited by examiner

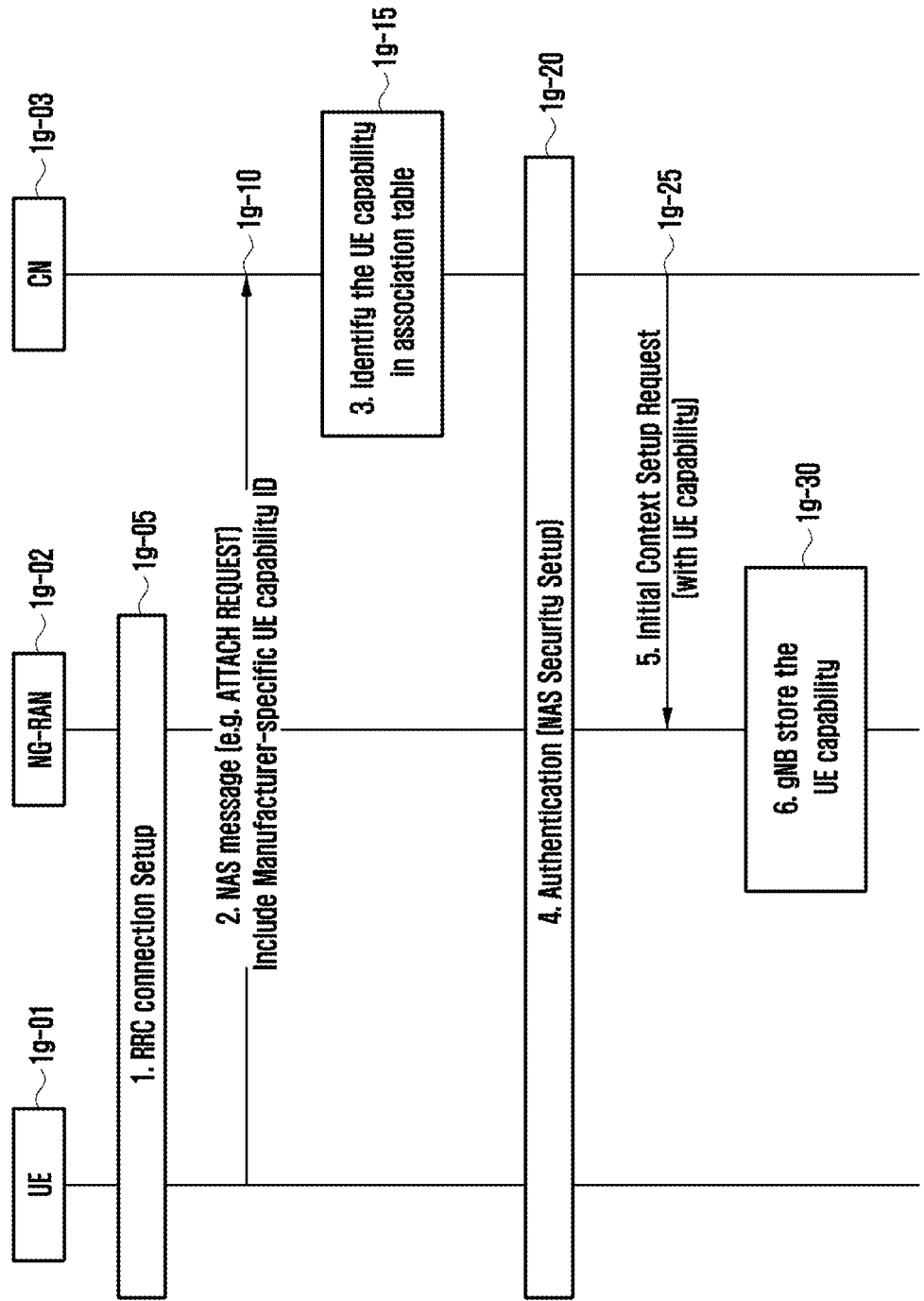

METHOD AND APPARATUS FOR REPORTING UE CAPABILITIES USING MANUFACTURER-SPECIFIC IDENTIFIER OF UE CAPABILITY IN NEXT MOBILE COMMUNICATION SYSTEMS

CROSS-REFERENCE TO RELATED APPLICATION

This application is a continuation of U.S. patent application Ser. No. 16/863,822 filed on Apr. 30, 2020, which is based on and claims priority under 35 U.S.C. § 119 to Korean Patent Application No. 10-2019-0051794 filed on May 2, 2019 in the Korean Intellectual Property Office, the disclosures of which are herein incorporated by reference in their entirety.

BACKGROUND

1. Field

The present disclosure relates to mobile communication systems, and in particular, to a method and an apparatus being capable of substituting reporting of UE capability by use of an identifier of the UE, without reporting the overall UE capabilities in a reporting method of the UE's own capability.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human-centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including, without limitation, smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

Where a base station requests a UE for its capability and the UE reports its capability information in response thereto, a method for performing the concerned operation with reduction of signaling overhead is required.

The above information is presented as background information only to assist with an understanding of the disclosure. No determination has been made, and no assertion is made, as to whether any of the above might be applicable as prior art with regard to the disclosure.

SUMMARY

An aspect of the disclosure is to provide examples of methods for substituting reporting of UE capability by use of information of an identifier which is specified for a UE having the same UE capability, in a series of procedures in which the UE receives a request for UE capability from a base station and reports the UE capability to the base station in the NR system. In certain embodiments, the above-described method may employ use of a manufacturer-specific UE identifier and use of a PLMN-specific UE identifier. In particular, the disclosure provides examples of general operations for methods of delivering UE capability by use of the manufacturer-specific UE identifier.

Another aspect of the disclosure is, for a specific UE belonging to a base station which supports both a basic uplink and an additional uplink in the NR system, to provide examples of allowing the additional uplink to be released.

In accordance with an aspect of the disclosure, certain methods according to this disclosure are performed by a terminal in a wireless communication system includes receiving, from a base station, information configuring an uplink (UL) of the base station and a supplementary uplink (SUL) of the base station for the terminal; communicating with the base station on the UL or the SUL, based on the information configuring the UL and the SUL for the terminal; receiving, from the base station, information on reconfigurationwithsync; and releasing the SUL, in case that the information on reconfigurationwithsync does not include information associated with a SUL configuration.

In accordance with an aspect of the disclosure, certain methods performed by a base station in a wireless communication system include transmitting, to a terminal, information configuring an uplink (UL) of the base station and a supplementary uplink (SUL) of the base station for the terminal; communicating with the terminal on the UL or the SUL, based on the information configuring the UL and the SUL for the terminal; and transmitting, to the terminal, information on reconfigurationwithsync, wherein the SUL is released, in case that the information on reconfigurationwithsync does not include information associated with a SUL configuration.

In accordance with certain embodiments of this disclosure, a terminal in a wireless communication system comprises a transceiver; and a controller configured to: receive, via the transceiver from a base station, information configuring an uplink (UL) of the base station and a supplementary uplink (SUL) of the base station for the terminal; communicate with the base station on the UL or the SUL, based on the information configuring the UL and the SUL for the terminal; receive, via the transceiver from a base station, information on reconfigurationwithsync; and release the SUL, in case that the information on reconfigurationwithsync does not include information associated with a SUL configuration.

In accordance with some embodiments as disclosed herein, a base station in a wireless communication system comprises a transceiver; and a controller configured to: transmit, via the transceiver to a terminal, information configuring an uplink (UL) of the base station and a supplementary uplink (SUL) of the base station for the terminal; communicate with the terminal on the UL or the SUL, based on the information configuring the UL and the SUL for the terminal; and transmit, via the transceiver to a terminal, information on reconfigurationwithsync, wherein the SUL is released, in case that the information on reconfigurationwithsync does not include information associated with a SUL configuration.

According to some embodiments of the disclosure, in some methods by which a NR UE reports its capability, there is an effect that reporting of UE capability can be substituted for using an identifier of the UE, without reporting the overall UE capabilities.

Also, methods of configuration of a base station as provided by some embodiments of this disclosure support a basic uplink and an additional uplink in a cell. However, as the specific UE is allowed to release the additional uplink, the concerned UE can do transmission and reception of data through the basic uplink. In this regard, there is an effect such that more wireless resources can be used or more capabilities of UE can be used.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1G illustrates an example of an operation to confirm UE capability by use of a manufacturer-specific identifier of UE capability, (referred to herein as a first reference example) according to certain embodiments of this disclosure;

DETAILED DESCRIPTION

FIGS. 1A through 2I, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, operation principles of certain embodiments according to this disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification. In the following description, terms for identifying access nodes, terms referring to network entities, terms referring to messages, terms referring to interfaces between network entities, terms referring to various identifiers and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform to other standards.

Figure 1A:
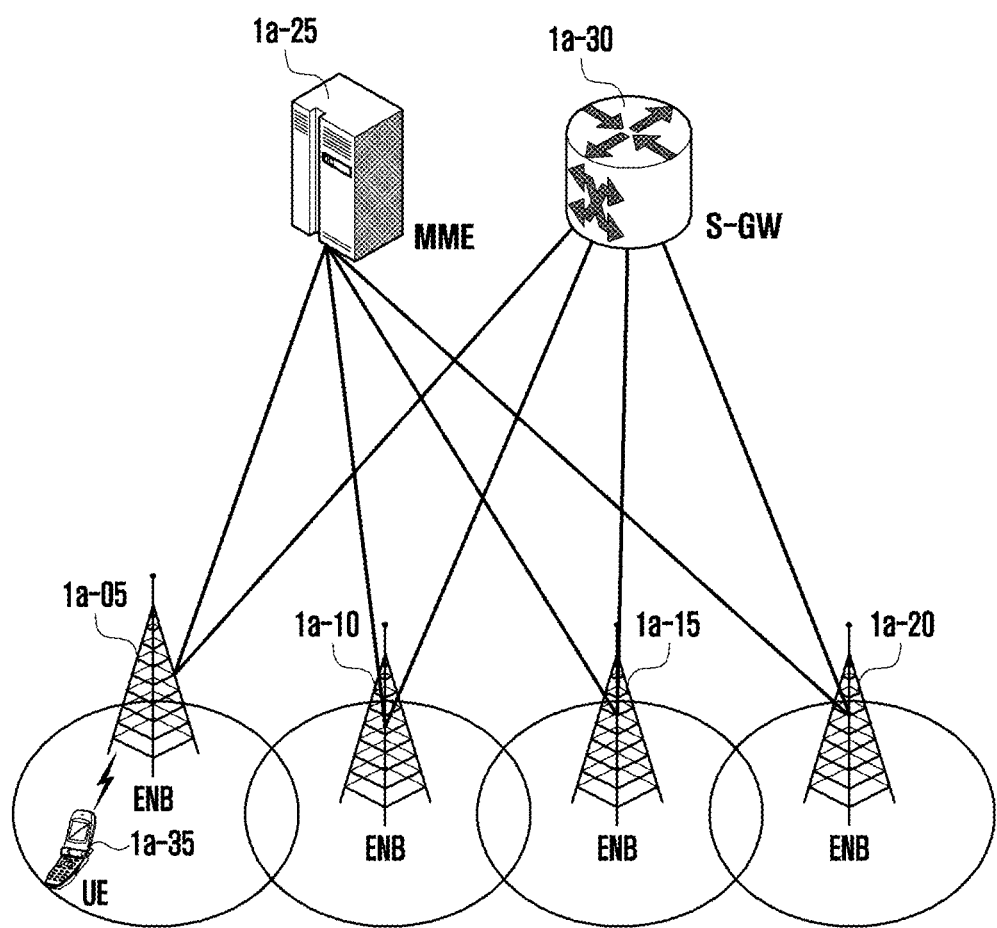
FIG. 1A illustrates an example of a structure of an LTE system, according to various embodiments of this disclosure.

FIG. 1A illustrates an example of a structure of an LTE system, according to various embodiments of this disclosure.

Referring to the non-limiting example of FIG. 1A, a wireless access network of an LTE system includes a next generation base station (Evolved node B; hereinafter referred to as "eNB", "Node B" or "base station") (1a-05, 1a-10, 1a-15, 1a-20), an MME (Mobility Management Entity, 1a-25), and S-GW (Serving-Gateway) (1a-30). A user equipment (hereinafter referred to as "UE") (1a-35) connects to an external network via eNB (1a-05 to 1a-20) and S-GW (1a-30).

In the non-limiting example of FIG. 1A, eNB (1a-05 to 1a-20) corresponds to an existing node B of the UMTS (Universal Mobile Telecommunication System) system. The eNB is connected to the UE (1a-35) via a wireless channel and performs a more complex role than the existing node B. In the LTE system, as all user traffic, including real-time services such as VoIP (Voice over IP) via an Internet protocol are served via a shared channel, a device for collecting and scheduling state information such as buffer state of UEs, available transformation power state, channel state, etc. is required. As such a device, the eNB (1a-05 to 1a-20) is used.

According to some embodiments, one eNB usually controls a number of cells. In order to realize a transmission speed of 100 Mbps, the LTE system uses, for example, orthogonal frequency division multiplexing (hereinafter referred to as "OFDM") in 20 MHz bandwidth as a wireless access technology. Also, the LTE system applies modulation scheme adaptive to a channel state of the UE and adaptive modulation & coding (hereinafter referred to as "AMC") to determine a channel coding rate. S-GW (1a-30) is a device which provides data bearer, generating or removing the data bearer according to control of an MME (1a-25). MME (1a-25) is a device which functions various controls as well as mobility management for a UE and is connected to a number of base stations.

Figure 1B:
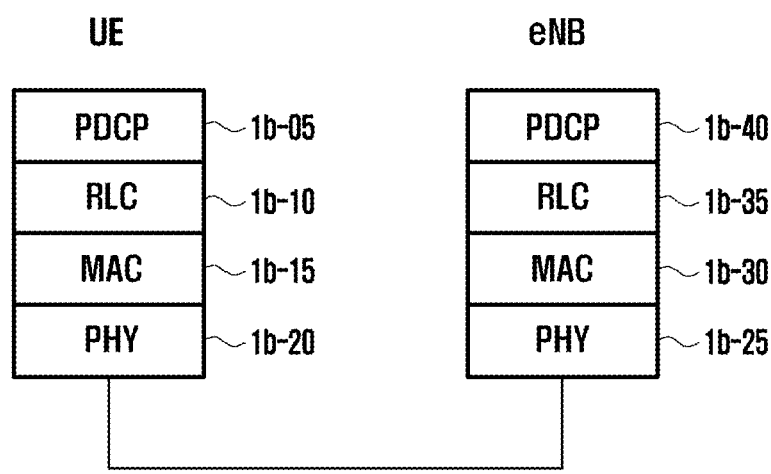
FIG. 1B illustrates an example of a wireless protocol structure in the LTE system, according to certain embodiments of this disclosure.

FIG. 1B illustrates an example of a wireless protocol structure in the LTE system according to various embodiments of this disclosure.

Referring to the non-limiting example of FIG. 1B, a wireless protocol of the LTE system includes PDCP (packet data convergence protocol) (1b-05, 1b-40), RLC (radio link control) (1b-10, 1b-35), and MAC (medium access control) (1b-15, 1b-30) at UE and eNB, respectively. PDCP (1b-05, 1b-40) operates to compress and restore an IP header, etc. The functions of PDCP comprise:

Header compression and decompression (ROHC only)
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception Duplicate detection of lower layer SDUs at PDCP re-establishment procedure for RLC AM Retransmission of PDCP SDUs at handover and, for split bearers in DC, of PDCP PDUs at PDCP data-recovery procedure, for RLC AM Ciphering and deciphering Timer-based SDU discard in uplink Radio Link Control (hereinafter referred to as "RLC") (1b-10, 1b-35) reconstructs PDCP PDU (Packet Data Unit) in appropriate sizes and performs ARQ operation, etc. The functions of RLC comprise:

Transfer of upper layer PDUs

Error Correction through ARQ (only for AM data transfer)

Concatenation, segmentation and reassembly of RLC SDUs (only for UM and AM data transfer)

Re-segmentation of RLC data PDUs (only for AM data transfer)

Reordering of RLC data PDUs (only for UM and AM data transfer

Duplicate detection (only for UM and AM data transfer)

Protocol error detection (only for AM data transfer)

RLC SDU discard (only for UM and AM data transfer)

RLC re-establishment

As shown in the illustrative example of FIG. 1B, MAC (1b-15, 1b-30) is connected to various RLC layer devices provided in a UE and performs operations to multiplex RLC PDUs into MAC PDUs and demultiplex RLC PDUs from MAC PDUs. The functions of MAC comprise:

Mapping between logical channels and transport channels

Multiplexing/demultiplexing of MAC SDUs belonging to one or different logical channels into/from transport blocks (TB) delivered to/from the physical layer on transport channels Scheduling information reporting Error correction through HARQ Priority handling between logical channels of one UE Priority handling between UEs by means of dynamic scheduling MBMS service identification Transport format selection Padding According to certain embodiments, a physical ("PHY") layer (1b-20, 1b-25) operates channel coding and modulation of upper layer data, makes the data into OFDM symbols and transmits the OFDM symbols via a wireless channel and demodulates the OFDM symbols received via the wireless channel, operates channel-decoding thereof and transmits the decoded data to the upper layer. Also in the physical layer, HARQ (Hybrid ARQ) is used to correct any additional error. Information on whether or not a receiver has received a packet transmitted from a transmitter is transmitted by using 1 bit. This is HARQ ACK/NACK information. Downlink HARQ ACK/NACK information for the uplink transmission is transmitted via a physical channel of PHICH (physical hybrid-ARQ indicator channel), and uplink HARQ ACK/NACK information for the downlink transmission may be transmitted via PUCCH (physical uplink control signal) or PUSCH (physical uplink shared channel).

The PHY layer may include one carrier or a plurality of frequencies/carriers. A technology to configure and use the plurality of frequencies simultaneously is called carrier aggregation (hereinafter referred to as "CA"). According to various embodiments, a carrier is used for communication between a user equipment (UE) and a base station (E-UTRAN Node B, eNB). However, CA technology uses one carrier or a plurality of secondary carriers in addition to a primary carrier, thereby increasing the amount of transmission according to the number of secondary carriers. In LTE, the cell in the base station using the primary carrier is PCell (Primary Cell) and the secondary cell is Scell (Secondary Cell).

In some embodiments, an RRC (radio resource control) layer is present in upper PDCP layers of the UE and the base station respectively, which is not illustrated in the accompanying drawings. The RRC layer can make a connection for wireless resource control and exchange configuration control messages associated with measurement.

Figure 1C:
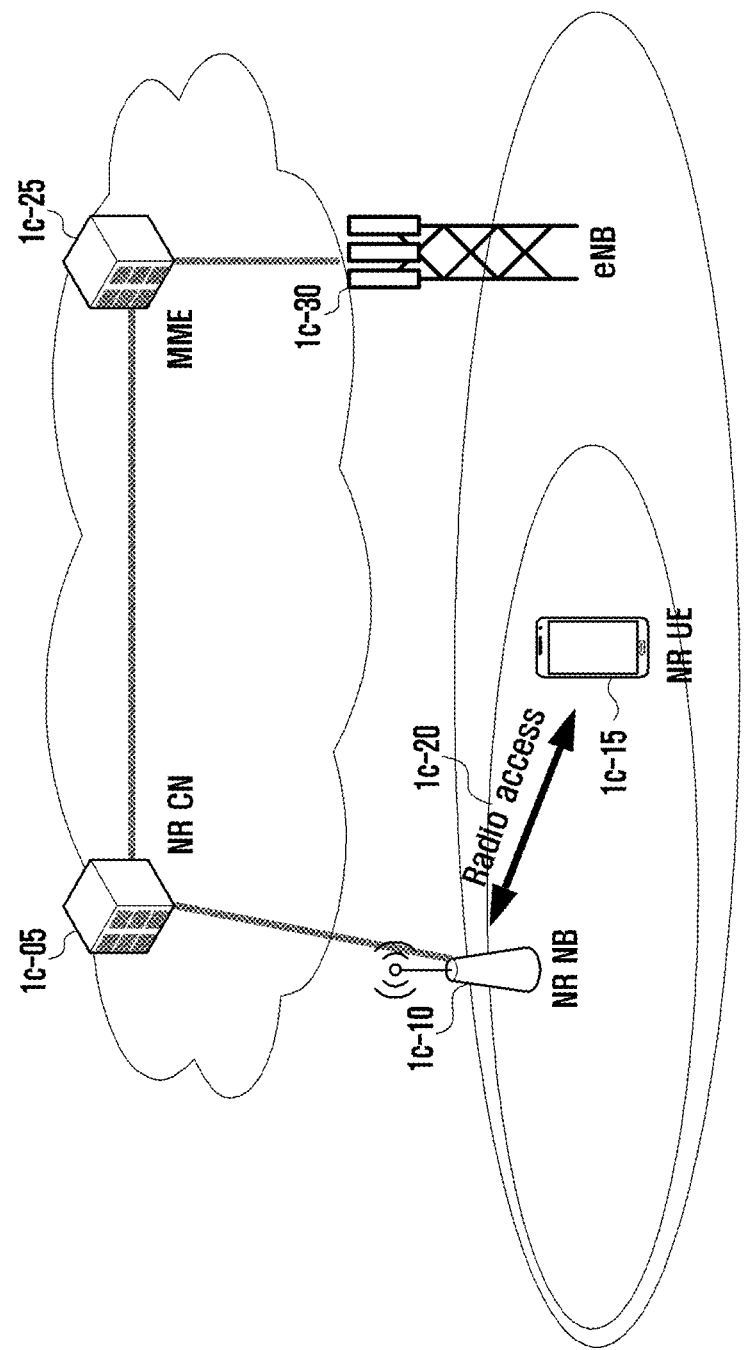
FIG. 1C illustrates an example of a structure of a next generation mobile communication system according to certain embodiments of this disclosure.

FIG. 1C illustrates an example of a structure of a next generation mobile communication system according to certain embodiments of this disclosure.

Referring to the non-limiting example of FIG. 1C, a wireless access network of the next generation mobile communication system includes a next generation base station (new radio node B; hereinafter referred to as "NR-NB") (1c-10) and a new radio core network or a next generation core network (hereinafter referred to as "NG CN" (1c-05). A new radio user equipment (hereinafter referred to as "NR UE") (1c-15) connects to an external network via NR NB (1c-10) and NR CN (1c-05).

In the illustrative example of FIG. 1C, the NR NB (1c-10) corresponds to the eNB (evolved node B) of the existing LTE system. The NR NB is connected to a NR UE (1c-15) via a wireless channel and can provide more excellent services than the existing node B. In certain embodiments of the next generation mobile communication system, as all user traffic is served via a shared channel, a device for collecting and scheduling state information including buffer state, available transmission power state, channel state, etc. of the UEs is required. In some embodiments, a NR NB (1c-10) is used as such a device. In various embodiments, one NR NB usually controls a plurality of cells. To realize ultra high speed data transformation as compared with existing LTEs, the NR NB can have a bandwidth equal to or greater than the existing maximum bandwidth and a beam forming technology can additionally be utilized by using orthogonal frequency division multiplexing (OFDM). Also, adaptive modulation & coding (AMC) to determine a modulation scheme and a channel coding rate adaptive to the channel state of the UE is applied in some embodiments. A NR CN (1c-05) functions to support mobility and set up bearer and QoS, etc. The NR CN is a device performing a variety of controls as well as mobility management for the UE and is connected to a number of base stations. Also, the next generation mobile communication system can be associated with the existing LTE system, and the NR CN is connected to MME (1c-25) via a network interface. In certain embodiments, an MME is connected to eNB (1c-30), which is an existing base station.

Figure 1D:
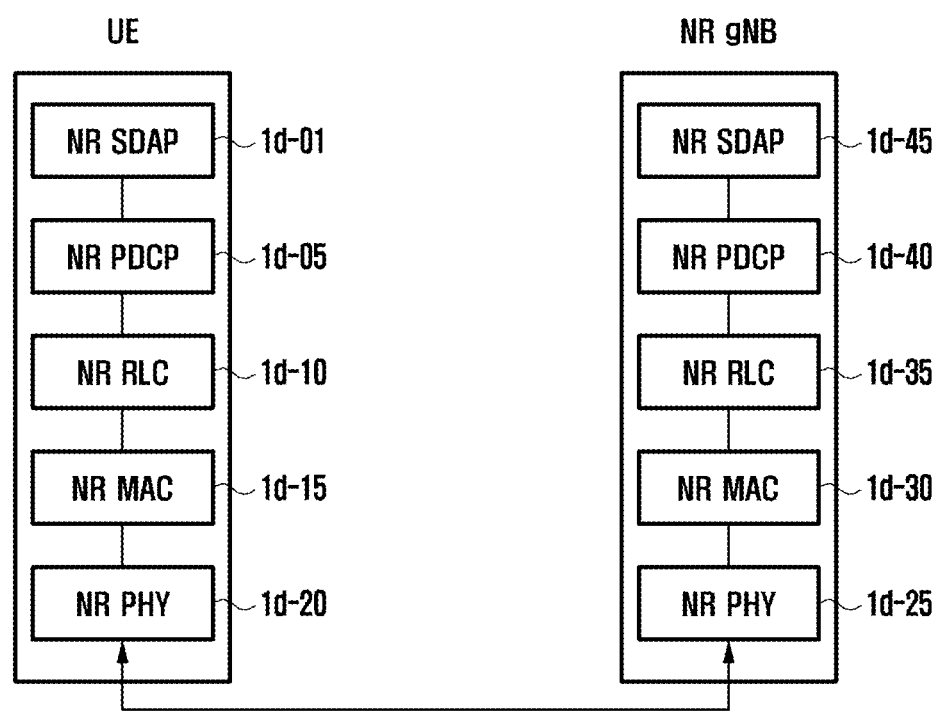
FIG. 1D illustrates an example of a wireless protocol structure of a next generation mobile communication system according to various embodiments of this disclosure.

FIG. 1D illustrates an example a wireless protocol structure of a next generation mobile communication system according to various embodiments of this disclosure.

Referring to the illustrative example of FIG. 1D, a wireless protocol of the next generation mobile communication system includes NR SDAP (1d-01, 1d-45), NR PDCP (1d-05, 1d-40), NR RLC (1d-10, 1d-35), and NR MAC (1d-15, 1d-30) at UE and NR base station respectively.

The functions of NR SDAP (1d-01, 1d-45) comprise:

Transfer of user plane data

Mapping between a QoS flow and a DRB for both DL and UL

Marking QoS flow ID in both DL and UL packets

Reflective QoS flow to DRB mapping for the UL SDAP PDUs

With respect to an SDAP layer device, a UE may receive, through an RRC message, a configuration as to whether to use a header of the SDAP layer device or to use a function of the SDAP layer device for each PDCP layer device, each bearer, or each logical channel. Where the SDAP header is set, the SDAP layer device can instruct the UE to update or reset QoS flows of the uplink and the downlink and mapping information for data bearer by a 1-bit NAS reflective QoS indicator and a 1-bit AS reflective QoS indicator of the SDAP header. The SDAP header may include QoS flow ID information representing QoS. The QoS information may be used as data processing priority, scheduling information, etc. to assist in the smooth provision of services.

The functions of NR PDCP (1d-05, 1d-40) comprise:
Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink In some embodiments, the reordering function of the NR PDCP device is a function to sequentially reorder PDCP PDUs received by the lower layer based on PDCP SN (sequence number). This function may include a function to transmit data to the upper layer in the reordered sequence or to directly transmit data without considering the sequence, and a function to record lost PDCP PDUs by reordering the sequence thereof. In addition, functions to report states of the lost PDCP PDUs to the transmitter, and to request retransmission of the lost PDCM PDUs may be included.

The functions of an NR RLC (1d-10, 1d-35) comprise:
Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment According to some embodiments, in-sequence delivery of the NR RLC device is a function to transmit RLC SDUs received from the lower layer to the upper layer in sequence, originally where one RLC SDU is segmented into several RLC SDUs and the segmented RLC SDUs are received, and may include a function to reassemble and transmit the received RLC PDUs may be included. A function to reorder the received RLC PDUs based on RLC SN or PDCP SN, a function to reorder the sequence of the received RLC PDUs and record lost RLC PDUs, a function to report the states of the lost RLC PDUs to the transmitter, and a function to request retransmission of the lost RLC PDUs may also be included. Where there is any lost RLC SDU, a function to transmit only the RLC SDUs prior to the lost RLC SDU to the upper layer in sequence may be included. Where a predetermined timer expires even though there is any lost RLC SDU, a function to transmit all the RLC SDUs received before the timer starts to the upper layer in sequence may be included. Where a predetermined timer expires even though there is any lost RLC SDU, a function to transmit all the RLC SDUs received up to now to the upper layer in sequence may be included. Also, the RLC PDUs may be processed in the order as they are received (in the order as arrived, without regard to the sequence of serial numbers, sequence numbers, etc.) and delivered to the PDCP device without regard to the sequence (out-of sequence delivery). In case of segments, segments are stored in a buffer or segments to be received later are received, and thereafter they are reconstructed into a complete single RLC PDU, which is then processed and delivered to the PDCP device. The NR RLC layer may not include a function of concatenation, or this function may be performed at the NR MAC layer or substituted for a multiplexing function of the NR MAC layer.

According to certain embodiments, an out-of sequence delivery function of the NR RLC device is a function to deliver the RLC SDUs received from the lower layer directly to the upper layer without regard to the sequence thereof. Where an originally single RLC SDU is segmented into several RLC SDUs and the segmented RLC SDUs are received, a function to reassemble them may be included. A function to store RLC SNs or PDCP SNs of the received RLC PDUs and order them in sequence, and record lost RLC PDUs may also be included.

As shown in the illustrative example of FIG. 1D, NR MAC (1d-15, 1d-30) can be connected to several NR RLC layer devices included in a UE, and main functions of NR MAC may include one or more of the following functions:
Mapping between logical channels and transport channels
Multiplexing/demultiplexing of MAC SDUs
Scheduling information reporting
Error correction through HARQ
Priority handling between logical channels of one UE
Priority handling between UEs by means of dynamic scheduling
MBMS service identification
Transport format selection
Padding According to certain embodiments, a NR PHY layer (1d-20, 1d-25) can operate channel coding and modulation of upper layer data, makes them into OFDM symbols and transmits the OFDM symbols via a wireless channel, and demodulates the OFDM symbols received via the wireless channel, operates channel-decoding thereof and transmits the decoded data to the upper link.

Figure 1E:
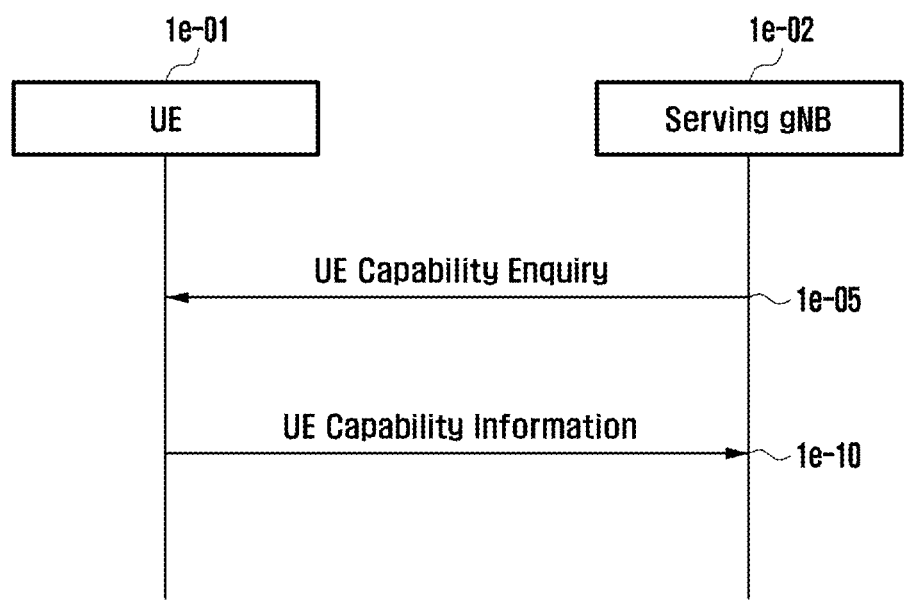
FIG. 1E illustrates an example of a message structure for reporting of UE capability in a NR system according to various embodiments of this disclosure.

FIG. 1E illustrates an example of a message structure for reporting of UE capability in a NR system according to certain embodiments of this disclosure.

In certain embodiments, a UE (1e-01) passes through a procedure to report capabilities supported by the UE to a serving base station (1e-02) in a state that the UE is connected to the concerned base station. In some embodiments, at operation 1e-05, the base station delivers to the UE in a connected state a UE capability enquiry message that requests reporting of the UE capabilities. The message may include a request by the base station for UE capability by each RAT type. The RAT type based request may include frequency band information as requested according to the priority thereof. Also, the UE capability enquiry message may request a plurality of RAT types in one RRC message container, or deliver to the UE the UE capability enquiry message including the RAT type based request several times. That is, the UE capability enquiry is repeated several times at 1e-05 and the UE may construct UE capability information messages corresponding thereto, and match a response to the concerned request and then report the response. In the next generation mobile communication system, UE capabilities for MR-DC including NR, LTE, EN-DC may be requested. For reference, the UE capability enquiry message is generally delivered in an initial stage after connection by the UE is made, but it may also be requested in any condition when the base station requires.

At the above operation, the UE having received the request for reporting UE capability from the base station constructs the UE capability according to RAT type and frequency band information as requested by the base station. An example of a method by the UE of constructing UE capability in the NR system according to various embodiments will be described below.

1. The UE may receive a request for a part or a whole of RAT types of LTE, EN-DC and NR, as a request for UE capability, from the base station, and may simultaneously receive a list of LTE and NR frequency bands. The UE constructs a band combination (BC) for EN-DC and NR stand-alone (SA). That is, based on the frequency bands requested as FreqBandList from the base station, a candidate list of BCs for EN-DC and NR SA is constructed. The concerned operation may be defined as an operation of compiling a candidate band combination. Also, the priority of the bands is determined in the sequence as described in the FreqBandList. The concerned operation may be performed one time without regard to the RAT type or operated repeatedly by each RAT type.

At the following operations, the concerned procedures are performed by each RAT type, and operated according to the priority of NR, MR-DC, and LTE, in order:

2. If "eutra-nr-only" flag or "eutra" flag is set to the RAT type of the UE capability request message, the RAT types for NR SA BCs are completely removed from the candidate list of BCs constructed above. This may occur only where the LTE base station (eNB) requests "eutra" capability.

3. Thereafter, the UE removes fallback BCs from the candidate list of BCs constructed at the above operation. The fallback BC is a case where the band corresponding to one SCell at minimum is removed from any super set of BCs. As the superset of BCs can already cover the fallback BC, it is possible to omit the fallback BC. In certain embodiments, this operation is also applied to EN-DC, that is, to LTE bands. The BCs remaining after this operation are the final "candidate list of BCs".

4. The UE selects BCs suitable for the requested RAT types from the final "candidate list of BCs" and selects BCs to be reported therefrom. In this operation, the UE constructs supportedBandCombinationList in the predetermined order. That is, the UE constructs BCs and UE capability to be reported according to the sequence of rat-Types as previously set (nr eutra-nr eutra). Also, featureSetCombination for the constructed spportedBandCombination is constructed, and a list of "candidate feature set combination" from the candidate list of BCs from which a list of the fallback BCs (including capabilities at the same or lower level) is removed is constructed. According to various embodiments, the "candidate feature set combination" includes the feature set combinations both for NR and EUTRA-NR BC and can be obtained from the feature set combination of UE-NR-Capabilities and UE-MRDC-Capabilities containers.

5. Also, if the requested ratType is eutra-nr and influences on supportedBandCombination of the concerned EN-DC or MR-DC, featureSetCombinations are set adaptively to the concerned rat Type, and all are included in the two containers of UE-MRDC Capabilities and UE-NR Capabilities. However, in some embodiments, the feature set of NR includes only UE-NR-Capabilities.

According to certain embodiments, after the UE capability is constructed, the UE delivers a UE capability information message including the UE capability to the base station at 1e-10. Based on the UE capability received from the UE, the base station performs proper scheduling and transmission and reception management to the concerned UE thereafter.

In certain embodiments, as part of the method for lowering the complexity in the existing procedure to request and report UE capability, applied to the NR system, the disclosure considers a method of enabling substitution of UE capability report by means of an identifier (ID) representing the UE capability. Generally, UEs can be set to have the same UE capabilities according to UE serial numbers specified by the manufacturer, or manufacturer-specific models. Also, where a base station and a core network have capability for the concerned UE, it is possible to store and use the UE capability. If the same UE capability is reported for the same UE models, the base station and the core network would always receive the same UE capability report for the concerned UE model, and therefore, they can perform optimization of the concerned operation. That is, if an identifier that represents capability of the concerned UE model is present and is reported by the UE, the base station and the core network can determine the concerned identifier and retrieve the UE capability. In order to use an identifier that represents the above UE capability, there are two options as described below.

1. Manufacturer-specific identifier (ID) of UE capability: It is possible to have an identifier for each manufacturer and each UE model (or for the UEs having the same UE capability among UEs of the same manufacturer), which may be an identifier that uniquely represents wireless link UE capability of the UE. Also, the concerned UE identifier may represent the entire capability of the UE.

2. PLMN-specific identifier (ID) of UE capability: In a situation that the above manufacturer-specific identifier of UE capability is not provided or the concerned base station and the core network cannot discern the identifier, an identifier that can be substituted therefor is required. The base station and the core network may provide a specific identifier to the UE according to the UE capability. The concerned identifier should be applicable to the serving PLMN and allotted to PLMN specifically.

Among the operations to report UE capability through the two identifiers, certain embodiments according to this disclosure provide operations for requesting and providing a manufacturer-specific identifier of UE capability and confirming the UE capability.

Figure 1F:
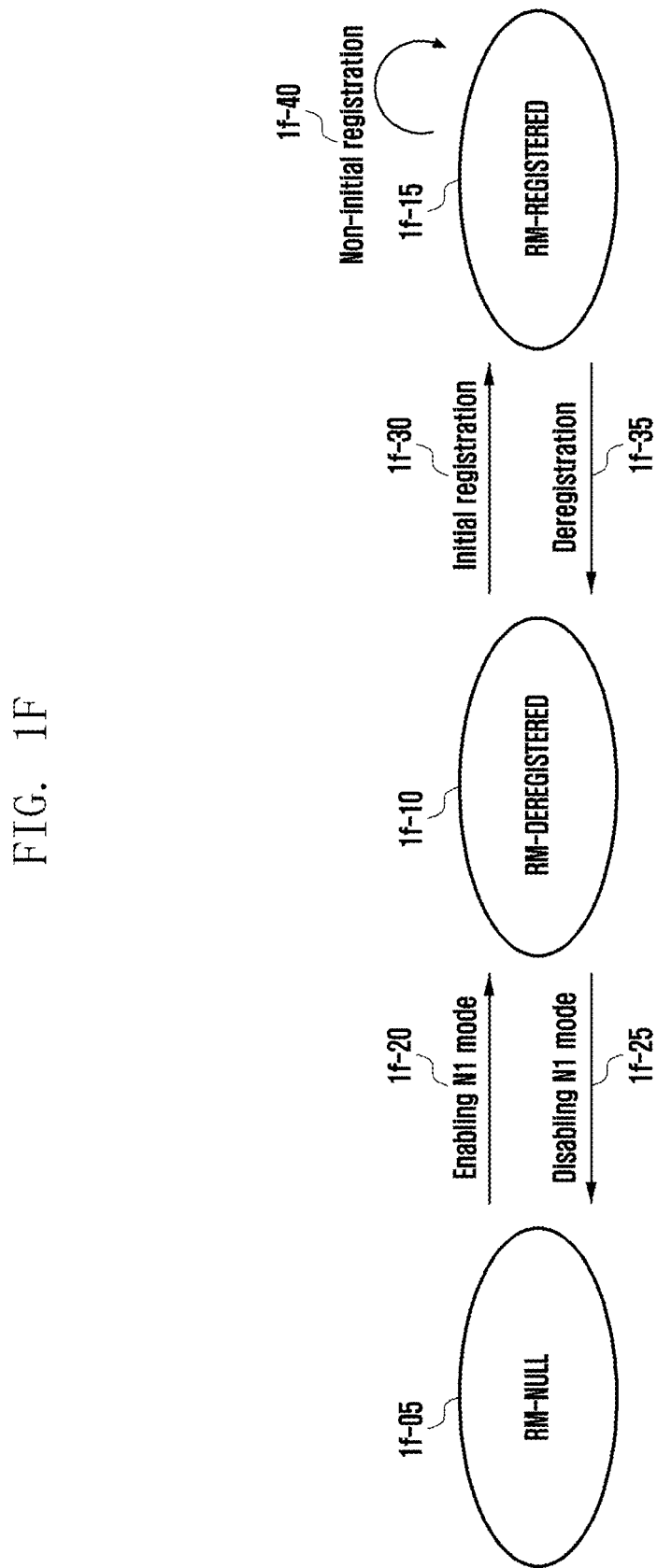
FIG. 1F illustrates an example of registration and deregistration of a UE with a 5G core network in a NR system according to certain embodiments of this disclosure.

FIG. 1F illustrates an example of registration and deregistration of a UE with a 5G core network in a NR system according to various embodiments of this disclosure.

Referring to the non-limiting example of FIG. 1F, until before initially registering a UE with a core network in the NR system, the UE is in a state of registration management (RM)-null with the concerned core network in operation 1f-05. Thereafter, if the concerned UE is activated in N1 mode (a mode that can be connected to a 5G core network) in operation 1f-20, the UE is present in a RM-DEREGISTRATION state with respect to the concerned core network as in the operation 1f-10. That is, this means that the concerned UE is capable of being connected to the 5G core network, but the procedure to connect and register has not yet been completed. The UE in this state will try the procedure to connect and register initially with the 5G core network in operation 1f-30. If this operation is completed, the UE is shifted to the state of RM-REGISTRATION in operation 1ƒ-15. Thereafter, even if the UE performs a procedure to change the serving cell, etc., this is not an operation for initial registration (1ƒ-40), and thus, the UE maintains the state of RM-REGISTRATION. If the UE is deregistered in operation 1ƒ-35, the UE is shifted again to the state of RM-DEREGISTRATION. In certain embodiments, if deactivation of N1 mode is applied at the concerned state, the UE is shifted to an RM-NULL state.

FIG. 1G illustrates an example of an operation to confirm UE capability by use of a manufacturer-specific identifier of UE capability, (referred to herein as a first reference example), according to various embodiments of this disclosure.

Referring to the non-limiting example of FIG. 1G, a UE (1g-01) in a RRC IDLE state can perform the RRC connection procedure with a specific NR base station (gNB) (1g-02) in operation 1g-05. After the concerned RRC connection procedure is performed, an NAS message including a manufacturer-specific identifier of UE capability (for example, ATTACH/REGISTRATION REQUEST) can be delivered to the core network (CN, 1g-03) to which the concerned base station is connected (1g-10). The core network having received the message, discerns the manufacturer-specific identifier of UE capability and checks whether UE capability corresponding to the concerned identifier is stored in operation 1g-15, and can confirm the UE capability mapped with the concerned identifier. In certain embodiments, the manufacturer-specific identifier of UE capability can be present as a table mapped with the UE capability in the core network. Thereafter, the UE and the core network perform a procedure to set up NAS security (authentication) in operation 1g-20, and the core network delivers the UE capability having been known as a result of confirming the manufacturer-specific identifier of UE capability to the base station in operation 1g-25. The message may be included in an INITIAL CONTEXT SETUP REQUEST message (NAS message). At the above operation, the core network can deliver the manufacturer-specific identifier of UE capability received from the UE together. In various embodiments, at operation 1g-30, the base station stores the UE capability received from the core network, and thereafter, can reflect the UE capability in configuration of the RRC with the UE. As the concerned base station has been informed of the UE capability through these procedures, the base station may not trigger an operation to request UE for UE capability.

Figure 1H:
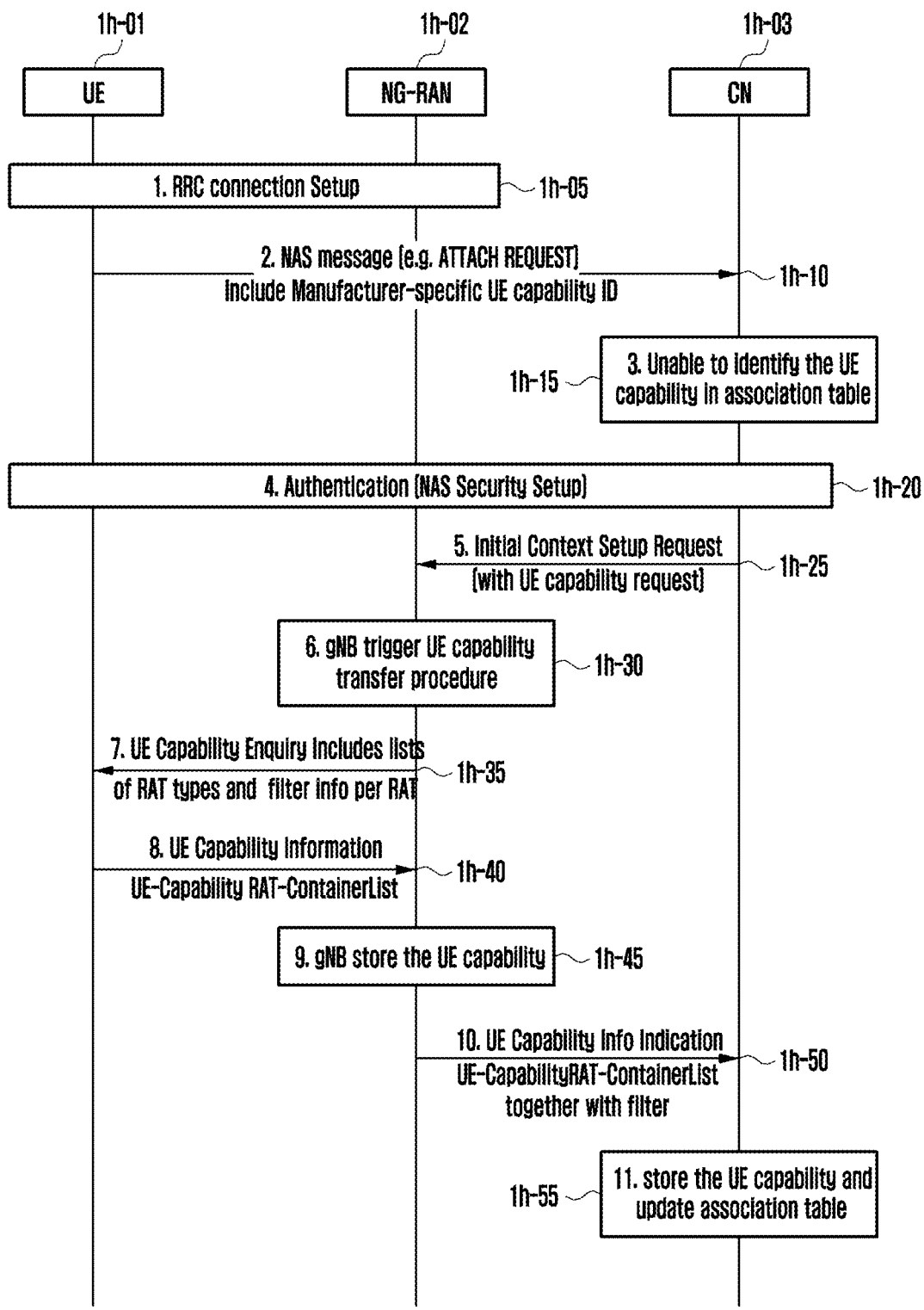
FIG. 1H illustrates an example of an operation when confirmation of UE capability by use of a manufacturer-specific identifier of UE capability fails, (referred to herein as a second reference example) according to various embodiments of this disclosure.

FIG. 1H illustrates an example of an operation when confirmation of UE capability by use of a manufacturer-specific identifier of UE capability fails, (referred to herein as a second reference example) according to various embodiments of this disclosure.

Referring to the non-limiting example of FIG. 1H, a UE (1h-01) in an RRC DEL state can perform the RRC connection procedure with a specific NR base station (gNB, 1h-02) in operation 1h-05. After the concerned RRC connection procedure is performed, an NAS message including a manufacturer-specific identifier of UE capability (for example, ATTACH/REGISTRATION REQUEST) can be delivered to a core network (CN) (1h-03) to which the concerned base station is connected (1h-10). The core network, having received the message, discerns the manufacturer-specific identifier of UE capability and confirms whether UE capability corresponding to the concerned identifier is stored in operation 1h-15, but cannot restore UE capability mapped with the concerned identifier. For this operation, the manufacturer-specific identifier of UE capability can be present in the form of a table mapped with the UE capability in the core network. However, in this process, the manufacturer-specific identifier of UE capability provided by the UE may not be stored and the concerned manufacturer-specific identifier of UE capability may not be identified. Thereafter, the UE and the core network perform a procedure to set up NAS security (authentication) in operation 1h-20. According to certain embodiments, at operation 1h-25, the core network informs the base station of having no UE capability for the UE and may deliver an INITIAL CONTEXT SETUP REQUEST message (NAS message) requesting the UE capability to the base station. In the above operation, the core network may deliver the manufacturer-specific identifier of UE capability received from the UE together. In the above operation, the base station confirms the manufacturer-specific identifier of UE capability received from the core network. If restoration is possible because the base station has UE capability information for the concerned identifier, the base station reports it to the core network and thereafter may omit the UE capability requesting procedure.

Referring to the non-limiting example of FIG. 1H, at operation 1h-30, the base station confirms a request for the UE capability received from the core network and can trigger the UE capability request. That is, in operation 1h-35, a UECapabilityEnquiry message, including a RAT type for the UE capability request and filtering information is delivered to the UE. In operation 1h-40, the UE reflects the concerned RAT type and filtering information and constructs UE capability in response to the UE capability request message received in operation 1h-35, and delivers UECapabilityInformation message to the base station. In the above operation, the UE may include the manufacturer-specific identifier of UE capability in the UECapabilityInfomation message. In operation 1h-45, the base station stores the UE capability information received from the UE. If the manufacturer-specific identifier of UE capability is received together from the UE, the concerned information is stored together. In operation 1h-50, the base station delivers the UECapabilityInformation message received from the UE to the core network. According to certain embodiments, the concerned UE capability may include filtering information in different containers by each RAT type and be delivered as it is (UE-CapabilityRAT-ContainerList together with filter). In operation 1h-55, the core network stores the UE capability received in the above operation and updates the UE capability mapping table including the manufacturer-specific identifier of UE capability and UE capability. Thereafter, the stored UE capability can be applied to the UE which provides the concerned manufacturer-specific identifier of UE capability.

Figure 1I:
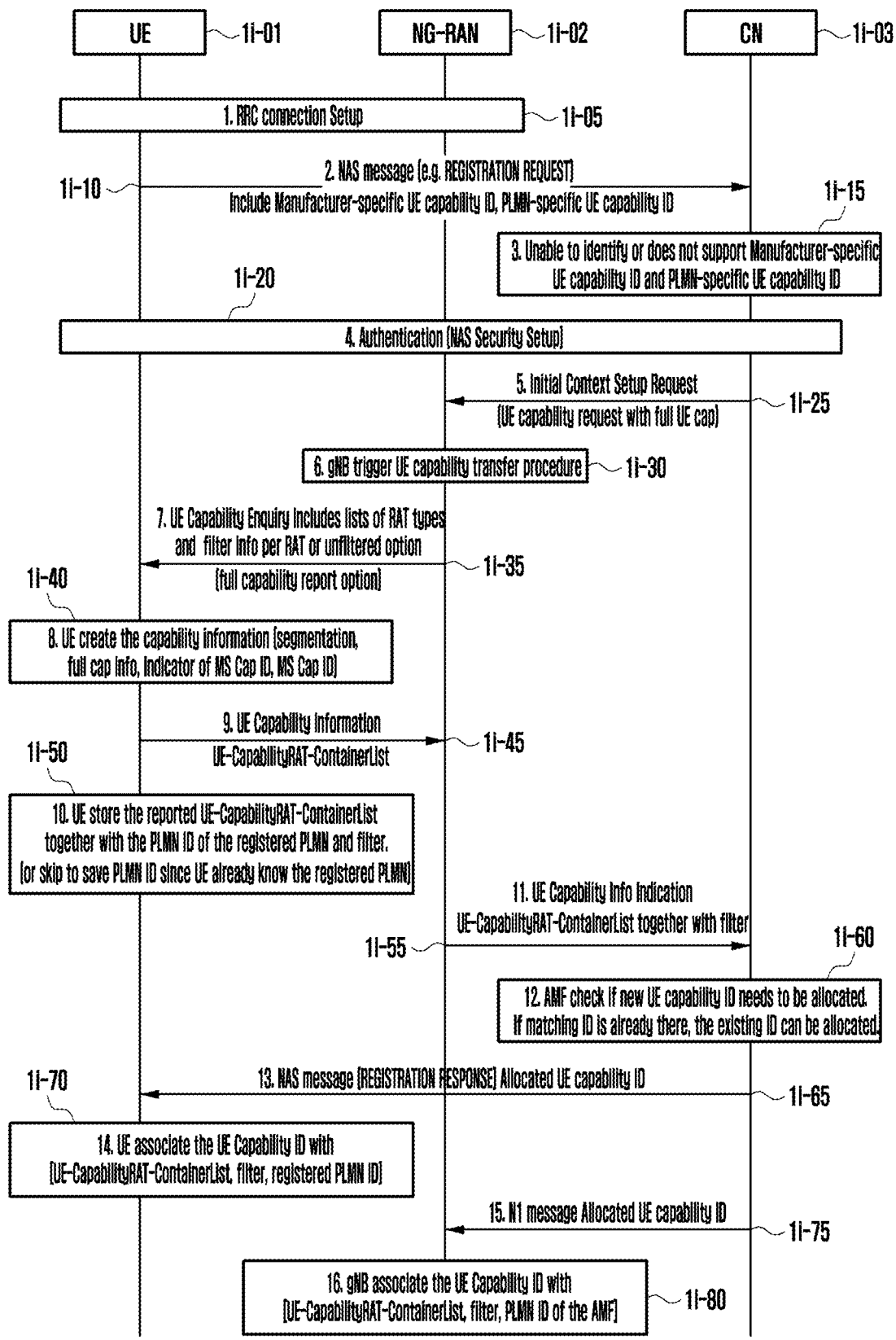
FIG. 1I illustrates an example of operations to request a manufacturer-specific identifier of UE capability and report the same, in particular, to generate the manufacturer-specific UE capability, according to certain embodiments of his disclosure.

FIG. 1I illustrates an example of operations to request a manufacturer-specific identifier of UE capability and report the same, in particular, to generate the manufacturer-specific UE capability, according to certain embodiments of this disclosure.

Referring to the non-limiting example of FIG. 1I, a UE (1i-01) in an RRC IDLE state can perform a RRC connection procedure with a specific NR base station (gNB, 1i-02) in operation 1i-05. After having performed the concerned RRC connection procedure, the UE can deliver an NAS message including a manufacturer-specific identifier of UE capability and a PLMN-specific identifier of UE capability (for example, ATTACH/REGISTRATION REQUEST) to a core network (CN) (1i-03) to which the concerned base station is connected (1i-10). In the above operation, the PLMN-specific identifier of UE capability may be optionally included in a case where the UE is in a previous connection state and the PLMN-specific UE capability allotted at the UE capability delivery procedure is present, and it may be delivered in as a list including a plurality of items. Also, the PLMN-specific identifier of UE capability may be selected in consideration of PLMN of the base station currently in a state of being connected to the concerned UE. That is, in some embodiments, only an identifier for a PLMN which is the same as a serving cell can be reported. The core network having received the PLMN identifier in operation 1i-15 confirms the concerned manufacturer-specific identifier of UE capability and the PLMN-specific identifier of UE capability so as to confirm whether or not the UE capability for the concerned identifier is stored, but may not restore the UE capability mapped with the concerned identifier.

In certain embodiments, for this operation, the manufacturer-specific identifier of UE capability and the PLMN-specific identifier of UE capability and UE capabilities can be present as a mapping table in the core network. However, in this process, the manufacturer-specific identifier of UE capability and the PLMN-specific identifier of UE capability, provided by the UE, may not be stored, and the concerned manufacturer-specific identifier of UE capability and the PLMN-specific identifier of UE capability may not be identified. Thereafter, the UE and the core network perform a procedure to set up NAS security (authentication) in operation 1i-20, and inform the base station of having no UE capability in operation 1i-25. According to various embodiments, an INITIAL CONTEXT SETUP REQUEST message (NAS message) requesting the UE capability may be delivered to the base station.

In the above operation, the core network can request the base station for full UE capability, which may be used in obtaining the manufacturer-specific UE capability. Also, the core network may deliver together the manufacturer-specific identifier of UE capability having been received from the UE. In the above operation, the base station confirms the manufacturer-specific identifier of UE capability having been received from the core network. In certain embodiments, if the base station has the UE capability information for the concerned identifier and it is possible to restore the UE capability, this is informed the core network and the UE capability request procedure is omitted thereafter.

The base station confirms the UE capability request having been received from the core network in operation 1i-30 and can trigger the UE capability request. That is, a UECapabilityEnquiry message including RAT type requesting UE capability and filtering information is delivered to the UE. The RRC message may include an option to request full UE capability, that is, manufacturer-specific UE capability in a filter. That is, information for requesting full capability may be included in the filtering information, or the information may be delivered in an unfiltered state by omitting filtering information by each RAT type, and this may be used to mean that the entire UE information should be reported. Also, the RRC message may include an indicator to indicate whether or not the UE can provide an identifier of UE capability.

According to various embodiments, if the UE possesses an indicator to indicate whether or not it can provide the UE capability identifier of the base station (or an indicator to indicate that the manufacturer-specific identifier of UE capability is not effective) and the PLMN-specific identifier of UE capability mapped for a UE request including RAT type and filtering, the UE can deliver a UECapabilityInformation message including only the concerned identifier to the base station in operation 1i-40. However, if the UE does not possess the PLMN-specific identifier of UE capability mapped for the request from the base station, the UE reflects the concerned RAT type and filtering information as in the existing procedure to generate and report UE capability and constructs UE capability in operations 1i-40 and 1i-45 and delivers the UECapabilityInformation message to the base station. The below operation addresses a procedure according to which the UE is requested to report the manufacturer-specific UE capability from the base station and reports it.

According to some embodiments, at operation 1i-40, the UE generates a UE capability message (UE capability information) for its own UE capability request from the base station. If the concerned message exceeds 9000 Bytes, which is the maximum size of PDCP PDU, segmentation is applied. That is, it can be known that the entire UE capability information message is segmented into segments having the size of 9000 Bytes, and the last segment may be a segment having a remaining size (subtracting the sum of segmented RRC messages from the entire message size). Also, in a case of receiving a request for full UE capability in operation 1i-35 (full capability indicator or unfiltered request), the UE may include the entire UE capability and an indicator to indicate that the UE capability to be reported is manufacturer-specific UE capability or a manufacturer-specific identifier of UE capability. However, if the UE capability to be reported is not identical to the manufacturer-specific UE capability (Full UE capability), information (indicator) indicating that the UE capability to be reported is not the manufacturer-specific UE capability (full UE capability) is included in the UE capability information message, which is delivered as it is (1i-45). According to certain embodiments, when the message is delivered, each RAT type is included in each container present in UE-CapabilityRAT-ContainerList, and is delivered as it is.

Where the UE delivers the manufacturer-specific identifier of UE capability and UE capability together included in the message in operation 1i-45, the base station and the core network store UE capability delivered, by associating it with the manufacturer-specific identifier of UE capability, which may be interpreted and used as UE capability thereafter. The below operation addresses a case where the UE does not deliver the manufacturer-specific UE capability in operation 1i-45. That is, where the UE delivers the UE capability together with an indicator indicating that the UE capability is not the manufacturer-specific UE capability, the UE capability information delivered in operation 1i-50 is stored in an internal buffer (memory), together with the RAT type and filtering information requested by the base station in association therewith. In addition, the UE can store registered PLMN information of the concerned serving cell connected from the system information (SIBI) having been received by the concerned serving cell. It is concluded that the UE stores the PLMN information, RAT type and filtering information, and reported UE capability in one group in the concerned operation.

As shown in the illustrative example of FIG. 1I, at operation 1i-55, the base station delivers the UECapabilityInformation message having received from the UE to the core network, and the concerned UE capability includes filtering information in different containers by each RAT type, which is transmitted as it is (UE-CapabilityRAT-ConainterList together with filter). Also, the message may include an indicator indicating that the UE capability is not the manufacturer-specific UE capability delivered from the UE. In operation 1i-60, the core network confirms the UE capability having been received at the above operation. Where the PLMN-specific identifier of UE capability mapped with the UE capability reported by the UE for the concerned filtering information and requested RAT type is present in the stored table, the concerned identifier is allotted as a PLMN-specific identifier of UE capability. However, if the reported UE capability is not possessed by the core network and is new, the core network may allot a new PLMN-specific identifier of UE capability thereto.

According to some embodiments, at operation 1*i*-65, the core network delivers to the UE the PLMN-specific identifier of UE capability attached adaptive to the UE capability reported by the UE by means of an NAS message (for example, ATTACH/REGISTRATION RESPONSE). The message may include index information to indicate whether the identifier is an identifier for any UE capability, or may be provided with the RAT type and the filtering information mapped with the concerned UE capability. A reason why the concerned operation is required is because operations 1*i*-35, 1*i*-40, and 1*i*-45 are, in certain embodiments, not finished at one time, but they may be successively completed. For example, the base station can deliver an NR-associated UE capability request for RAT type and a filter in operation 1*i*-35. After having received the concerned UE capability from the UE in operation 1*i*-45, the base station repeats operation 1*i*-35 once again and requests EN-DC UE capability, and receives report of the concerned UE capability in operation 1*i*-45. In this case, the PLMN-specific identifiers of UE capability for the two UE capabilities having successively been received should be distinguished for allocation. Therefore, index information to distinguish them (for example, the first capability report of UE is set 1 and the second capability report of UE is set 2) may be included, or filing information may be delivered together.

Also, in certain embodiments, the method of the core network's allotting a PLMN-specific identifier of UE capability in operation 1*i*-60 may be applied differently depending upon network realization. For example, the concerned UE capability may be specified only for a case where UE capability reports for a specific UE are received and the number of UE reports to provide the same UE capability as the concerned UE capability is greater than a predetermined critical value (N) and the PLMN-specific identifier of UE capability may be allotted thereto. That is, an algorithm not to allot a specific PLMN-specific identifier of UE capability only with a few UE capability reports is required in certain embodiments.

Referring to the non-limiting example of FIG. 1I, at operation 1*i*-70, the UE maps the PLMN-specific identifier of UE capability having been received from the core network in operation 1*i*-65 with the UE capability storage group reported and stored by the UE in operation 1*i*-50 and newly stores the same. That is, the UE groups the PLMN-specific identifier of UE capability, registered PLMN information, RAT type and filtering information, and reported UE capability and stores them in one group at the concerned operation. Thereafter, a PLMN-specific identifier of UE capability allotted to represent the concerned UE capability can be used. Also, in the above operation, the number of PLMN-specific identifiers of UE capability that the UE can store may be limited. If the UE capability for a new PLMN-specific identifier of UE capability should be stored in a state that the UE has stored the predetermined number of PLMN-specific identifier of UE capability, the PLMN-specific identifier of UE capability and the concerned UE capability group having previously been stored can be erased and updated to new values. Also, in certain embodiments, it is possible to perform an operation to erase information for the other PLMNs, remaining information only for the same PLMN in the above operation.

Thereafter, in operation 1*i*-75, the core network can deliver to the base station via an N1 message the PLMN-specific identifier of UE capability having been delivered to the UE, and the base station stores the PLMN-specific identifier of UE capability, registered PLMN information, RAT type and filtering information, and reported UE capability in one group, based on the PLMN-specific identifier of UE capability received in operation 1*i*-80, the UE capability received in operation 1*i*-45, and the RAT type and filtering information having been delivered to the UE in operation 1*i*-35. Thereafter, where the UE uses the PLMN-specific identifier of UE capability allotted to represent the concerned UE capability, the base station having received the PLMN-specific identifier of UE capability may not trigger the UE capability request.

Figure 1J:
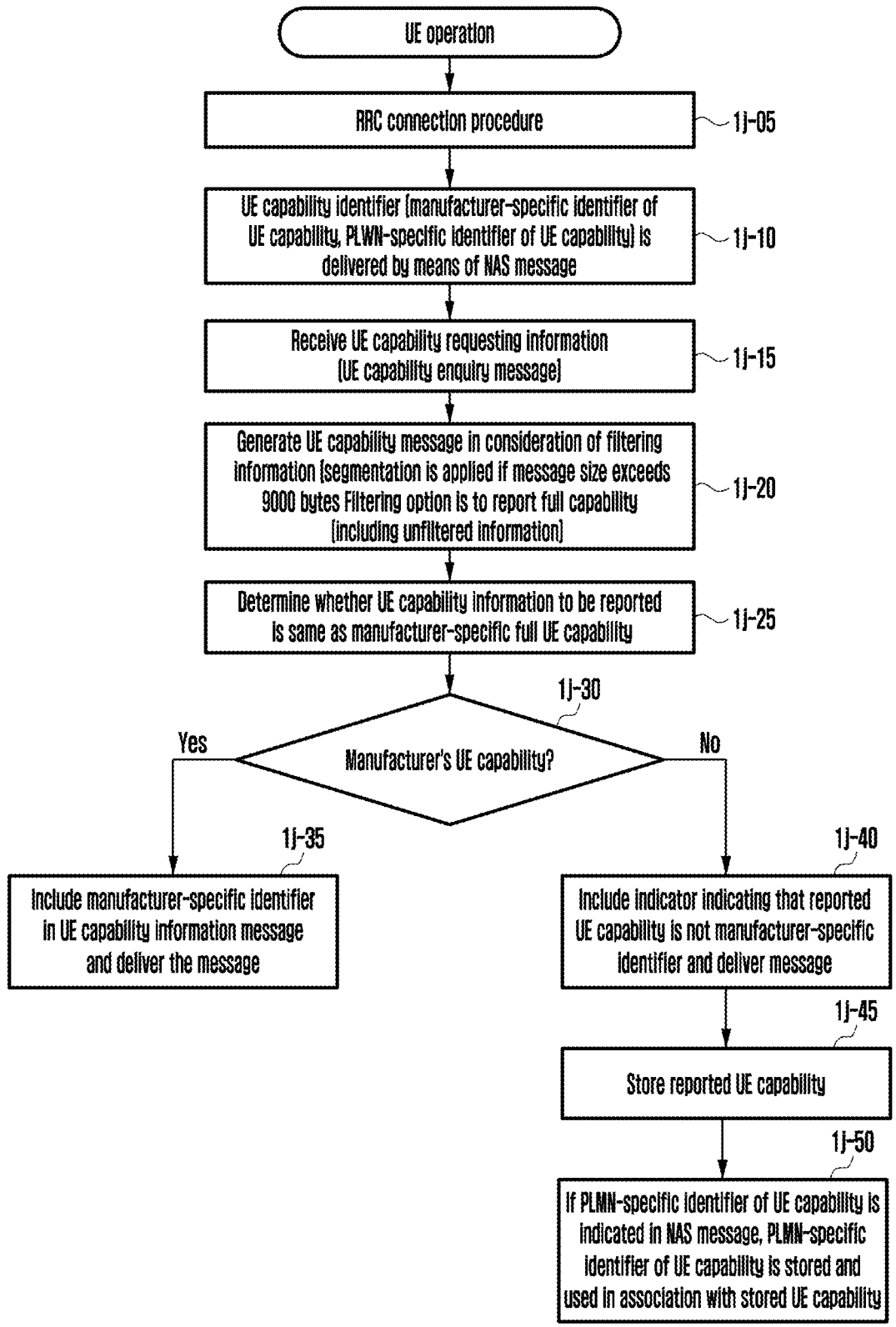
FIG. 1J illustrates an example of operations by the UE to receive a request for manufacturer-specific UE capability and an identifier thereof and report them, according to certain embodiments of this disclosure.

FIG. 1J illustrates an example of operations by the UE to receive a request for manufacturer-specific UE capability and an identifier thereof and report same, according to certain embodiments of this disclosure.

Referring to the non-limiting example of FIG. 1J, in operation 1*j*-05, the UE can be camped on a specific serving cell and shifted to an RRC connection state. Immediately after being connected to the concerned cell, the UE delivers an identifier of UE capability that the UE possesses, via an NAS message (for example, INITIAL ATTACH/REGISTRATION REQUEST message) to the core network connected to the concerned base station in operation 1*j*-10. The concerned identifier may include a manufacturer-specific identifier of UE capability and a PLMN-specific identifier of UE capability. According to certain embodiments, in a state that the PLMN-specific identifier of UE capability has not been allotted, only the manufacturer-specific identifier of UE capability can be included. In operation 1*j*-15, where the core network or the base station fails to restore the UE capability for the identifier of UE capability having been delivered by the UE, the UE will receive a message that requests report of UE capability through the base station. The UE capability request message may include a filter that requests full UE capability. Otherwise, the message may be delivered in an unfiltered state, with omission of all the filtering information by each RAT type, which may be used to mean that the full UE information is to be reported.

In operation 1*j*-20, the UE generates UE capability information in response to the above UE capability request message. That is, considering the filtering information having been requested in operation 1*j*-15, the UE capability message is generated. If the size of the message is in excess of 9000 Bytes, the UE capability information is segmented, generating segmented information. Also, in certain embodiments, in operation 1*j*-25, it is determined whether the UE capability information generated in operation 1*j*-20 is the same as the manufacturer-specific full UE capability (1*j*-30). If the generated UE capability information is same as the manufacturer-specific full UE capability, the full capability information is reported in operation 1*j*-35. Simultaneously, an indicator indicating that the concerned UE capability is the manufacturer-specific full UE capability, and the manufacturer-specific full UE capability, are included therein and reported to the base station.

As shown in the illustrative example of FIG. 1J, at operation 1*j*-25, it is determined whether the UE capability information generated in operation 1*j*-20 is the same as the manufacturer-specific full UE capability (1*j*-30). Where the generated UE capability information is not the same as the manufacturer-specific full UE capability, the UE includes an indicator indicating that the reported UE capability is not the manufacturer-specific full UE capability and delivers the same in operation 1*j*-40. In operation 1*j*-45, the UE stores the reported UE capability in a buffer (memory). Thereafter in operation 1*j*-50, if a PLMN-specific identifier of UE capability is indicated via an NAS message, the stored UE capability is associated with the PLMN-specific identifier of UE capability and then stored and used. That is, in the concerned operation, the UE stores the PLMN-specific identifier of UE capability, registered PLMN information, RAT type and filtering information, reported UE capability in one group. Thereafter, the PLMN-specific identifier of UE capability allotted to represent the concerned UE capability can be used.

Also, in the above operation, the number of PLMN-specific identifiers of UE capability stored by the UE may be limited. If the UE capability for a new PLMN-specific identifier of UE capability should be stored in a state that the UE has stored the predetermined number of PLMN-specific identifiers of UE capability, the PLMN-specific identifier of UE capability and the concerned UE capability group having previously been stored can be erased and updated to new values. Also, it is possible to perform an operation to erase information for the other PLMNs, remaining information only for the same PLMN in the above operation.

Figure 1K:
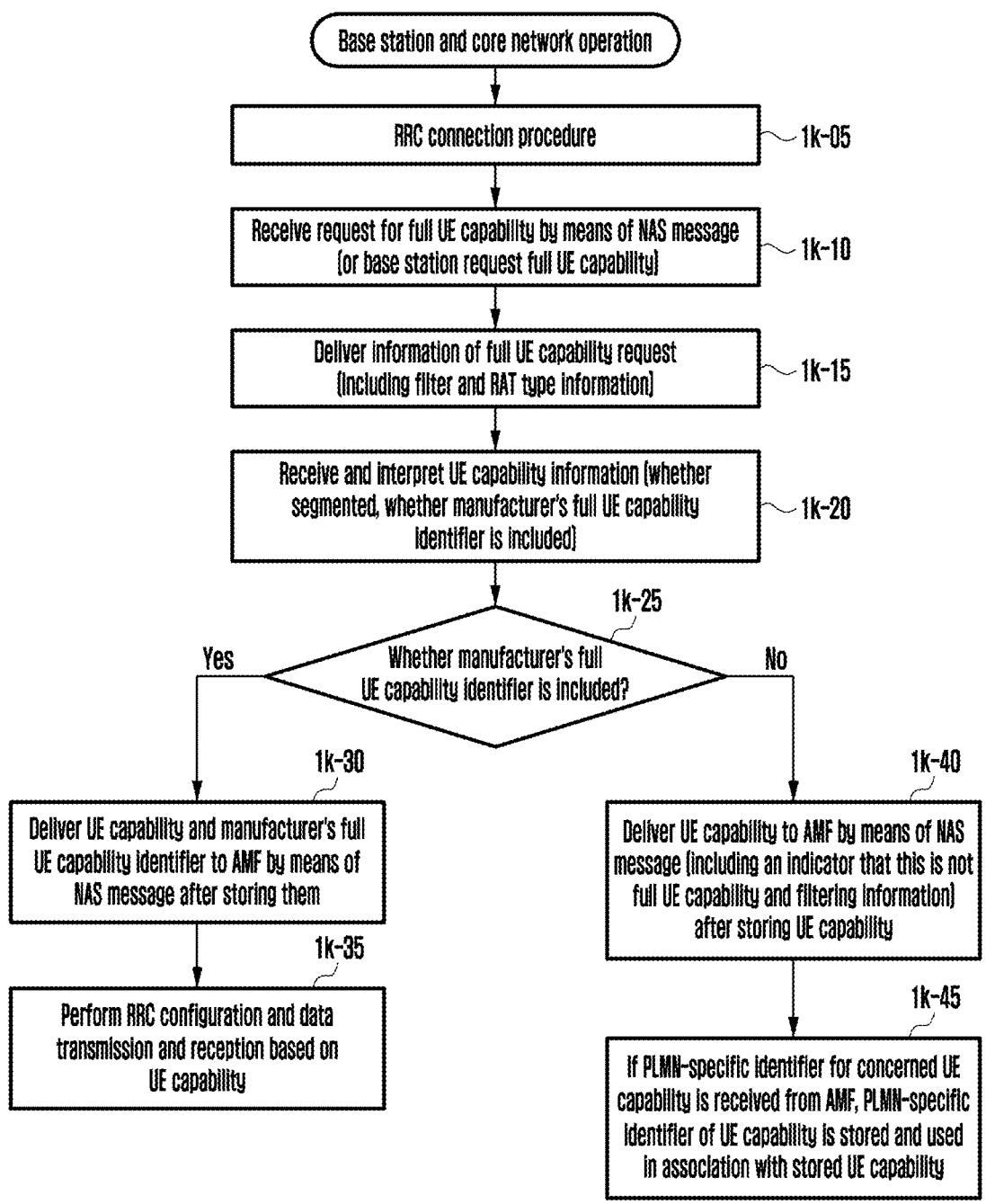
FIG. 1K illustrates an example of operations by a base station and a core network to request for manufacturer-specific UE capability and an identifier thereof and receive a report therefor, according to certain embodiments of this disclosure.

FIG. 1K illustrates an example of operations by a base station and a core network to request for manufacturer-specific UE capability and an identifier thereof and receive a report therefor, according to various embodiments of this disclosure.

As shown in the non-limiting example of FIG. 1K, at operation 1*k*-05, if a specific UE is camped on a concerned cell, a base station performs an RRC connection procedure and can shift the UE to a connected state. A core network connected to a base station can receive an identifier of UE capability that the UE possesses via an NAS message (for example, ATTACH/REGISTRATION REQUEST message). The concerned identifier may include a manufacturer-specific identifier of UE capability and a PLMN-specific identifier of UE capability. In certain embodiments, in a state that no PLMN-specific identifier of UE capability is allotted, only the manufacturer-specific identifier of UE capability may be included. In operation 1*k*-10, the core network determines whether the UE has UE capability based on the received identifier. If the concerned UE has no manufacturer-specific UE capability, the core network can instruct the base station to start a procedure to request the required UE capability. The base station can receive an indicator requesting the full UE capability from the core network at the concerned operation, or the core network may allow any necessity for the full UE capability to occur inside the base station.

According to some embodiments, at operation 1*k*-15, the base station can deliver a message to request UE capability to the UE, and the concerned message may include RAT type and filtering information such as frequency, or an indicator indicating that the concerned request is to obtain a manufacturer-specific UE capability of the UE. The above UE capability request message may include a filter to request full UE capability, or the message may be delivered in an unfiltered state, omitting the filtering information by each RAT type, which may be used to mean that the full UE capability information should be reported.

In operation 1*k*-20, the UE delivers UE capability information in response to the UE capability request message to the base station, and the base station decodes and interprets the concerned received information to thereby obtain the UE capability. Where an indicator indicating whether the UE capability information having been received in operation 1*k*-25 is the same as the manufacturer-specific full UE capability, or a manufacturer-specific identifier of UE capability is in the received message, the base station determines that the reported UE capability is the manufacturer-specific full UE capability and can store the concerned UE capability in the buffer and memory. The received UE capability information and the indicator information are delivered to the core network in a NAS message (1*k*-30).

Where an indicator indicating whether the UE capability information having been received in operation 1*k*-25 is the same as the manufacturer-specific full UE capability, or a manufacturer-specific identifier of UE capability is not in the received message, the base station determines that the reported UE capability is not the manufacturer-specific full UE capability and can store the concerned UE capability in the buffer and memory. The received UE capability information and the indicator information are delivered to the core network in a NAS message (1*k*-40). Even where the concerned message is delivered, an indicator indicating that the reported UE capability is not the manufacturer-specific full UE capability may be included. In the illustrative example of FIG. 1K, at operation 1*k*-45, if the base station receives a PLMN-specific identifier of UE capability for the concerned UE capability from an AMF (core network), the base station associates the identifier with the stored UE capability, and stores and manages them. Thereafter, they are used for configuration with the UE.

Figure 1L:
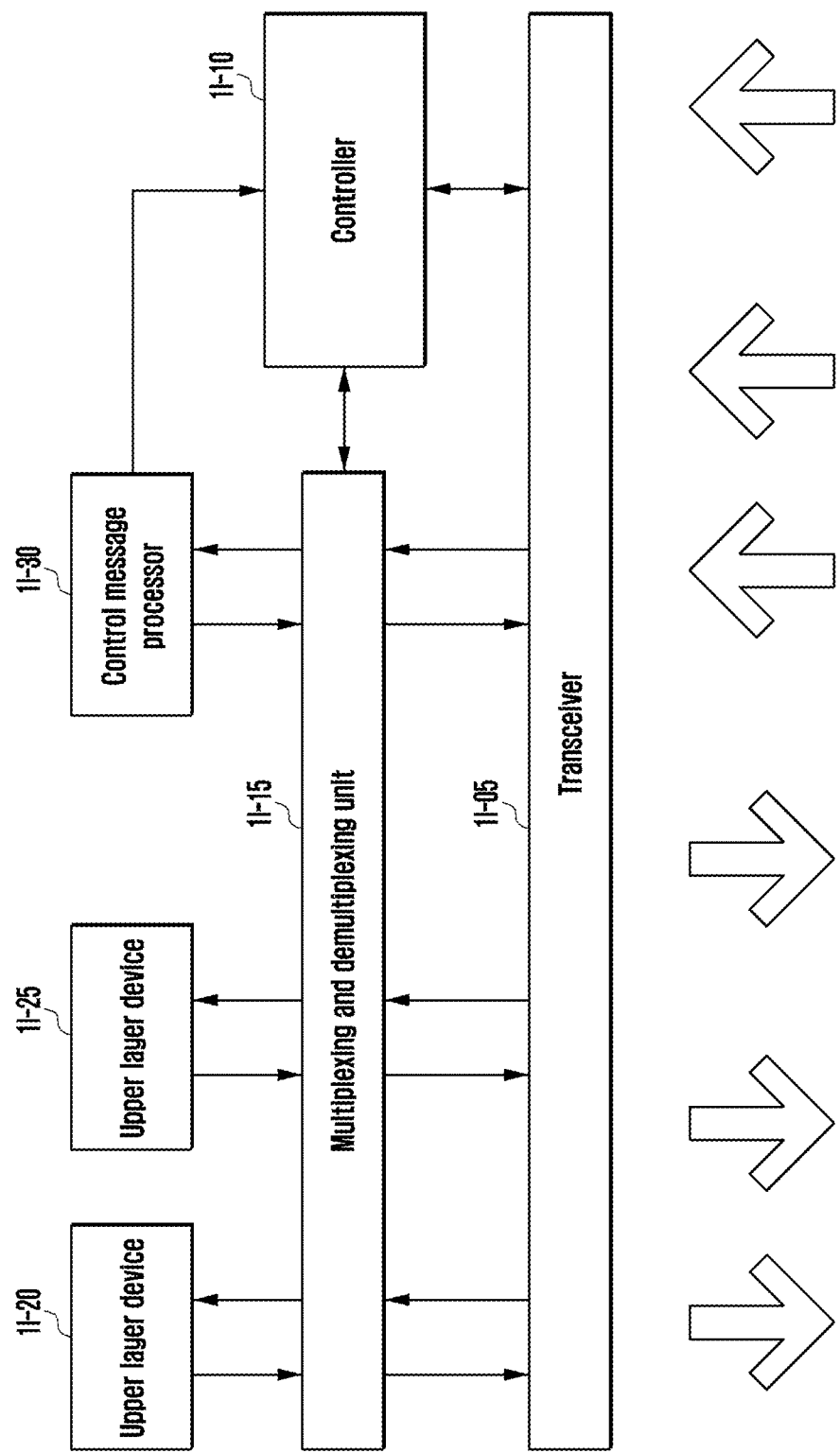
FIG. 1L illustrates, in block diagram format, an example a configuration of a UE according to various embodiments of this disclosure.

FIG. 1L illustrates, in block diagram format, an example of a configuration of a UE according various embodiments of this disclosure.

As shown in the illustrative example of FIG. 1L, a UE according to an exemplary embodiment of the disclosure includes a transceiver (1*l*-05), a controller (1*l*-10), a multiplexing and demultiplexing unit (1*l*-15), a variety of uplink processors (1*l*-20, 1*l*-25), and a control message processor (1*l*-30).

The transceiver (1*l*-05) receives data and a predetermined control signal by a forward channel of a serving cell and transmits the data and the predetermined control signal by a backward channel. Where a plurality of serving cells are set, the transceiver (1*l*-05) performs data transmission and reception and control signal transmission and reception through the plurality of serving cells. The multiplexing and demultiplexing unit (1*l*-15) plays a role of multiplexing data generated in the uplink processors (1*l*-20, 1*l*-25) or the control message processor (1*l*-30) or demultiplexing the data received by the transceiver (1*l*-05), and delivering the data to the uplink layer processors (1*l*-20, 1*l*-25) or the control message processor (1*l*-30).

According to certain embodiments, the control signal processor (1*l*-30) transceives a control message from a base station and conducts a necessary operation therefor. The operation includes a function to process the control message such as RRC message and MAC CE, and report of a CBR measurement value, and reception by UE of resource pool and RRC message for an operation. The uplink layer processor (1*l*-20, 1*l*-25) refers to a DRB device and can be configured by each service. Data generated by user services such as FTP (file transfer protocol) or VoIP (voice over Internet protocol) is processed and delivered to the multiplexing and demultiplexing unit (1*l*-15), or data delivered from the multiplexing and demultiplexing unit (1*l*-15) is processed and delivered to a service application of the uplink layer. The controller (1*l*-10) confirms a scheduling instruction received through the transceiver (1*l*-05), for example, backward grants and controls the transceiver (1*l*-05) and the multiplexing and demultiplexing unit (1*l*-15) so that backward transmission to an appropriate transmission resource time can be performed at an appropriate.

The disclosure has been described with reference to an example of a UE which includes a plurality of blocks and the respective blocks perform different functions, which merely constitutes an exemplary embodiment of the disclosure, and the disclosure is not limited thereto. For example, a function that is performed by the multiplexing and demultiplexing unit (1*l*-15) may be performed by the controller (1*l*-10) itself.

Figure 1M:
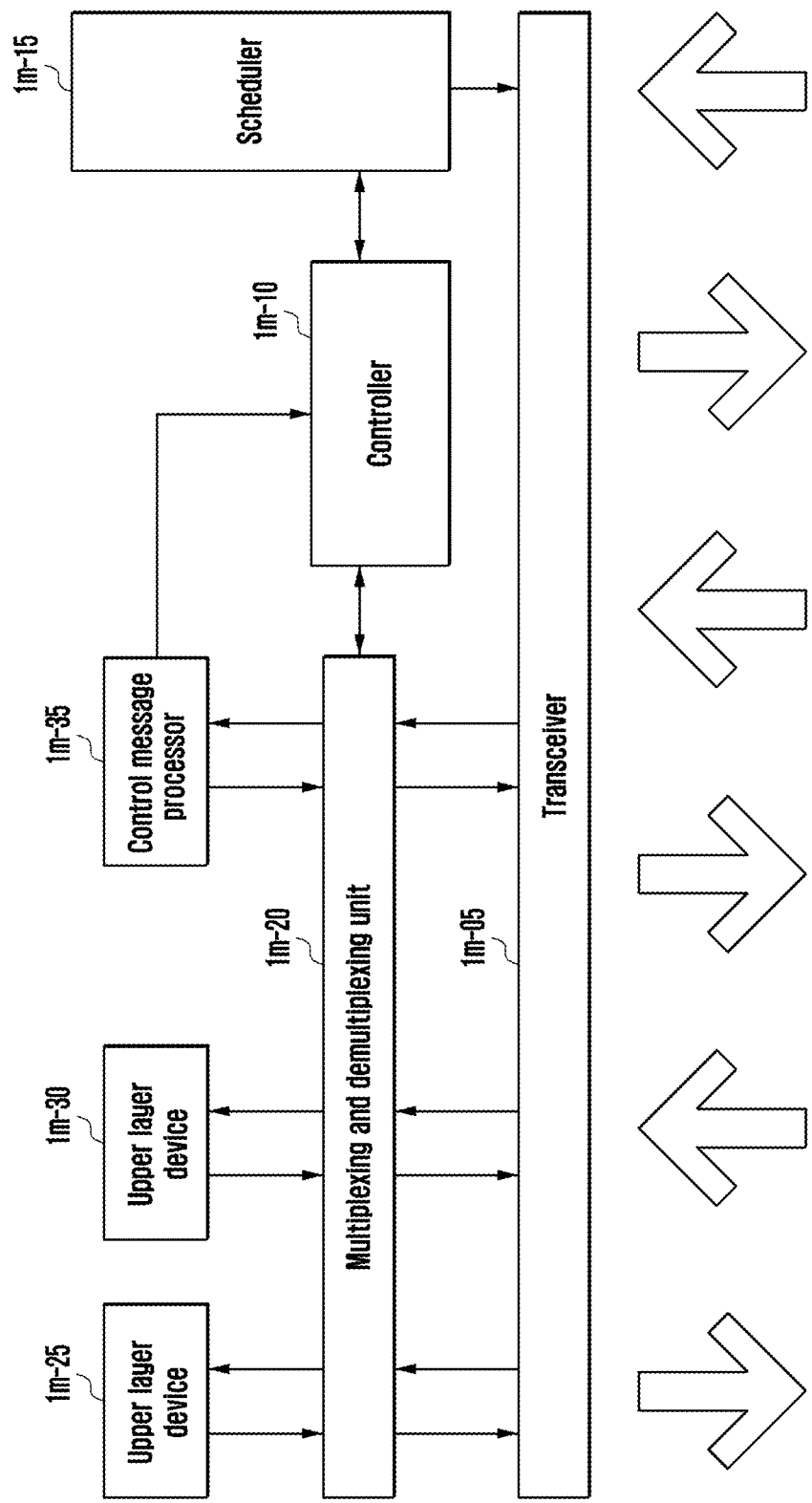
FIG. 1M illustrates, in block diagram format, an example of a configuration of a base station according to various embodiments of this disclosure.

FIG. 1M illustrates, in block diagram format, an example a configuration of a base station according to certain embodiments of this disclosure.

Referring to the non-limiting example of FIG. 1M, a base station device includes a transceiver (1*m*-05), a controller (1*m*-10), a multiplexing and demultiplexing unit (1*m*-20), a control message processor (1*m*-35), a variety of uplink processors (1*m*-25, 1*m*-30), and a scheduler (1*m*-15).

The transceiver (1*m*-05) transmits data and a predetermined control signal by a forward carrier and receives data and a predetermined control signals by a backward carrier. Where a plurality of carriers are set, the transceiver (1*m*-05) performs data transmission and reception and control signal transmission and reception through the plurality of carriers. The multiplexing and demultiplexing unit (1*m*-20) plays a role of multiplexing data generated in the uplink processors (1*m*-25, 1*m*-30) or the control message processor (1*m*-35) or demultiplexing data received by the transceiver (1*m*-05), and delivering the data to the proper uplink layer processors (1*m*-25, 1*m*-30), the control message processor (1*m*-35), or the controller (1*m*-10).

According to certain embodiments, the control message processor (1*m*-35) receives an instruction from the controller and generates a message to be delivered to the UE, and delivers the message to a downlink layer. The uplink layer processor (1*m*-25, 1*m*-30) may be constructed by each UE and each service, and processes data generated by user services such as FTP or VoIP, etc. and delivers the data to the multiplexing and demultiplexing unit (1*m*-20), or processes data delivered from the multiplexing and demultiplexing unit (1*m*-20) and delivers the data to a service application of the uplink layer. The scheduler (1*m*-15) allots any transmission resource to the UE at appropriate time, in consideration of buffer state of the UE, channel state, and active time of the UE, etc., and processes a signal delivered by the UE to the transceiver or processes the signal so as to be delivered to the UE.

Figure 2A:
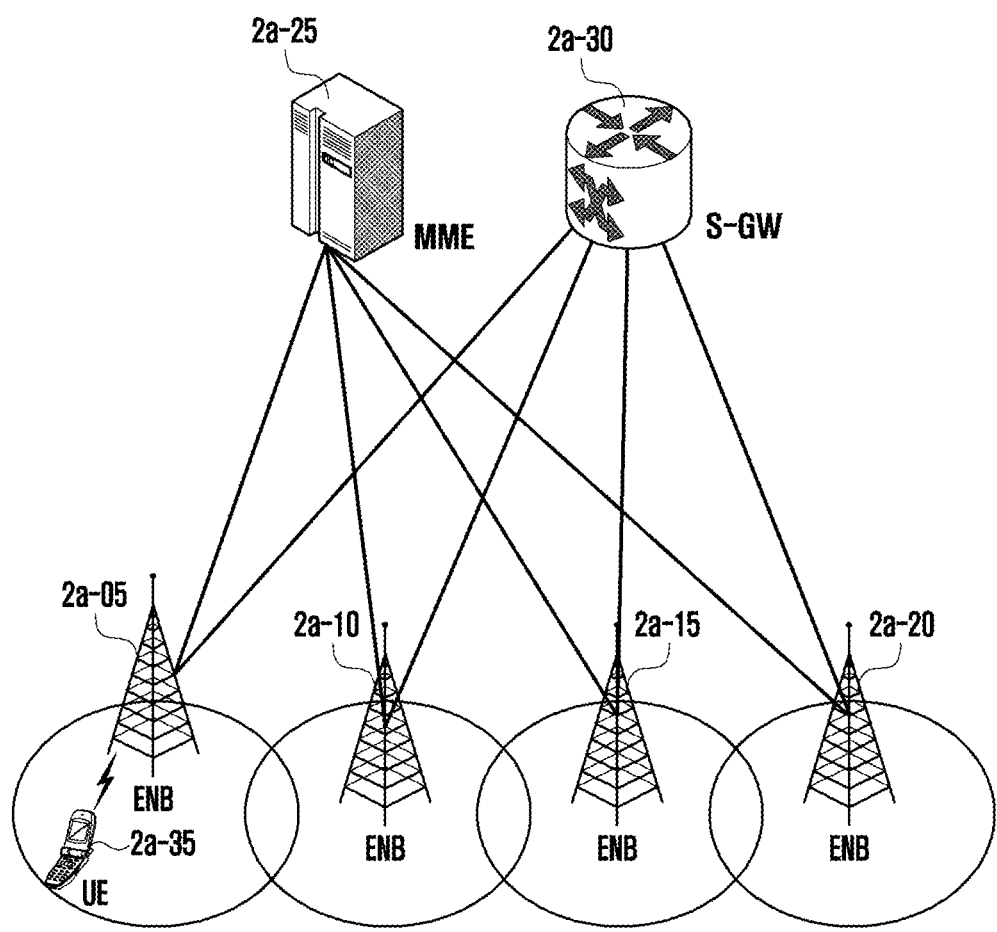
FIG. 2A illustrates an example of a structure of an LTE system, according to certain embodiments of this disclosure.

FIG. 2A illustrates an example of a structure of an LTE system, according to various embodiments of this disclosure.

Referring to the non-limiting example of FIG. 2A, a wireless access network of the LTE system includes a next generation base station (Evolved node B, "eNB", "Node B" or "base station") (2*a*-05, 2*a*-10, 2*a*-15, 2*a*-20), MME (mobility management entity, 2*a*-25), and S-GW (serving-gateway, 2*a*-30). User equipment ("UE") (2*a*-35) connects to an external network via eNB (2*a*-05 to 2*a*-20) and S-GW (2*a*-30).

In FIG. 2A, the eNB (2*a*-05 to 2*a*-20) corresponds to an existing node B of the UMTS (Universal Mobile Telecommunication System) system. An eNB is connected to UE (2*a*-35) via a wireless channel, performing a more complex role than the existing node B. In the LTE system, as all user traffics including real-time services such as VoIP (voice over IP) via an Internet protocol are served via a shared channel, a device for collecting and scheduling state information such as buffer state, available transformation power state, channel state of UEs, etc. is required. As such a device, the eNB (2*a*-05 to 2*a*-20) is used.

According to certain embodiments, one eNB usually controls a number of cells. In order to realize a transmission speed of 100 Mbps, the LTE system uses, for example, orthogonal frequency division multiplexing ("OFDM") in 20 MHz bandwidth as a wireless accessing technology. Also, the LTE system applies modulation scheme adaptive to the channel state of the UE and adaptive modulation & coding ("AMC") to determine a channel coding rate. S-GW (2*a*-30) is a device which provides data bearer and generates or removes data bearer according to control of MME (2*a*-25). MME (2*a*-25) is a device which functions various controls as well as mobility management for a UE.

Figure 2B:
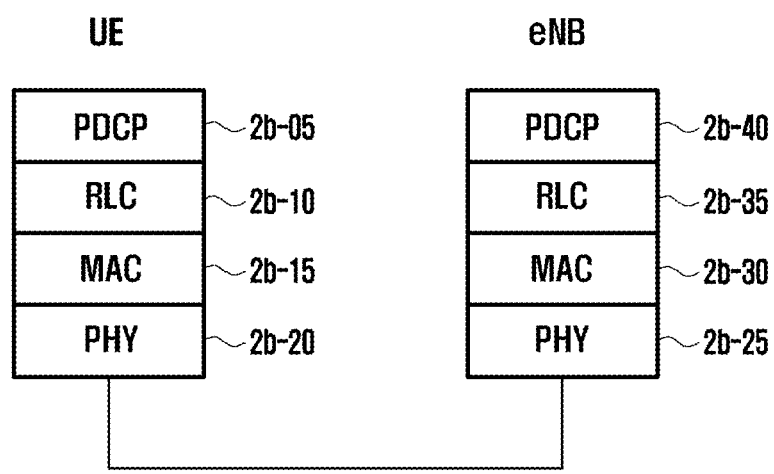
FIG. 2B illustrates an example of a wireless protocol structure in the LTE system, according to certain embodiments of this disclosure.

FIG. 2B illustrates a wireless protocol structure in the LTE system, according to certain embodiments of this disclosure.

Referring to the non-limiting example of FIG. 2B, a wireless protocol of the LTE system includes PDCP (packet data convergence protocol) (2*b*-05, 2*b*-40), RLC (radio link control) (2*b*-10, 2*b*-35), and MAC (medium access control) (2*b*-15, 2*b*-30) layers at UE and eNB respectively. PDCP (2*b*-05, 2*b*-40) operates to compress and restore an IP header, etc. Functions of the PDCP layer comprise:
  Header compression and decompression: ROHC only
  Transfer of user data
  In-sequence delivery of upper layer PDUs at PDCP re-establishment procedure for RLC AM
  For split bearers in DC (only support for RLC AM): PDCP PDU routing for transmission and PDCP PDU reordering for reception
  Duplicate detection of lower layer SDUs at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink
  Radio link control ("RLC") (2*b*-10, 2*b*-35) reconstructs PDCP PDU (Packet Data Unit) in appropriate sizes and performs ARQ operation, etc. Functions of the RLC layer comprise:
  Transfer of upper layer PDUs
  Error Correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer
  Duplicate detection (only for UM and AM data transfer)
  Protocol error detection (only for AM data transfer)
  RLC SDU discard (only for UM and AM data transfer)
  RLC re-establishment
  MAC layer (2*b*-15, 2*b*-30) is connected to various RLC layer devices provided in a UE and performs operations to multiplex RLC PDUs into MAC PDUs and demultiplex RLC PDUs from MAC PDUs. Functions of the MAC layer comprise:
  Mapping between logical channels and transport channels
  Multiplexing/demultiplexing of MAC SDUs belonging to one or different logical channels into/from transport blocks (TB) delivered to/from the physical layer on transport channels Scheduling information reporting
Error correction through HARQ
Priority handling between logical channels of one UE
Priority handling between UEs by means of dynamic scheduling
MBMS service identification
Transport format selection
Padding A physical ("PHY") layer (2b-20, 2b-25) operates channel coding and modulation of upper layer data, to make the data into OFDM symbols and transmit the OFDM symbols via a wireless channel, and demodulates the OFDM symbols received via the wireless channel, operates channel-decoding thereof and transmits the decoded data to the upper link. Also, even in the physical layer, HARQ (hybrid ARQ) is used to correct any additional error. Information on whether or not a receiver has received a packet transmitted from a transmitter has received is transmitted by using 1 bit. This is HARQ ACK/NACK information. Downlink HARQ ACK/NACK information for the uplink transmission is transmitted via a physical channel of PHICH (physical hybrid-ARQ indicator channel), and uplink HARQ ACK/NACK information for the downlink transmission may be transmitted via PUCCH (physical uplink control signal) or PUSCH (physical uplink shared channel).

The PHY layer may include one or a plurality of frequencies/carriers. A technology to configure and use the plurality of frequencies simultaneously is called carrier aggregation ("CA"). Only a carrier has been used for communication between a user equipment (UE) and a base station (E-UTRAN Node B, eNB). However, the CA technology uses one or a plurality of secondary carriers in addition to a primary carrier, thereby being capable of drastically increasing the amount of transmission according to the number of secondary carriers. In the LTE, the cell in the base station using the primary carrier is PCell (Primary Cell) and the secondary cell is Scell (Secondary Cell).

In addition, an RRC (radio resource control) layer is present in upper PDCP layers of the UE and the base station respectively, which is not illustrated in the accompanying drawings. The RRC layer can make a connection for wireless resource control and exchange configuration control messages associated with measurement.

Figure 2C:
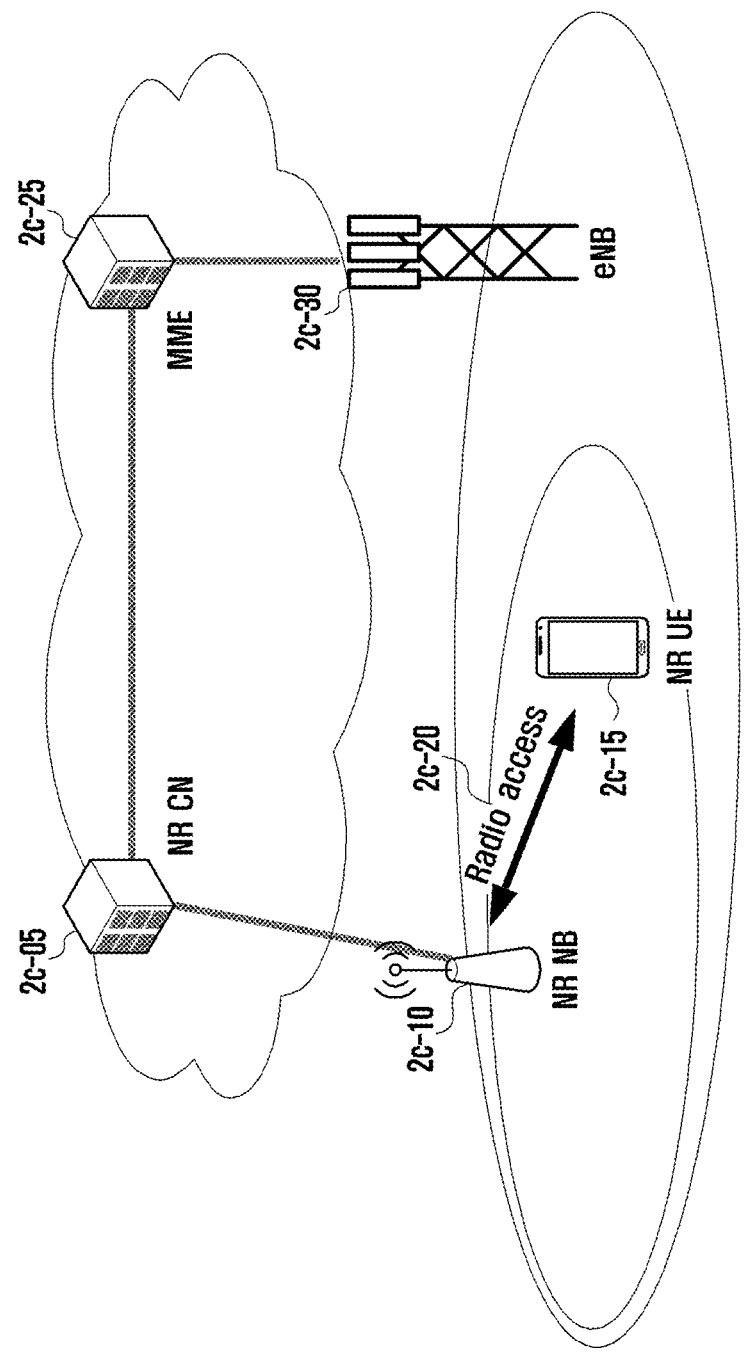
FIG. 2C illustrates an example of a structure of the next generation mobile communication system according to some embodiments of this disclosure.

FIG. 2C illustrates an example of a structure of the next generation mobile communication system according to various embodiments of this disclosure.

Referring to the illustrative example of FIG. 2C, a wireless access network of the next generation mobile communication system includes a next generation base station (new radio node B, "NR-NB") (2c-10) and a new radio core network or a next generation core network ("NG CN") (2c-05). A new radio user equipment ("NR UE") (2c-15) connects to an external network via NR NB (2c-10) and NR CN (2c-05).

In the explanatory example of FIG. 2C, the NR NB (2c-10) corresponds to the eNB (evolved node B) of the existing LTE system. The NR NB is connected to NR UE (2c-15) via a wireless channel and can provide more excellent services than the existing node B. In the next generation mobile communication system, as all user traffics are served via a shared channel, a device for collecting and scheduling state information including buffer state, available transmission power state, channel state, etc. of the UEs is required. As such a device, NR NB (2c-10) is used. One NR NB usually controls a plurality of cells. To realize ultra high speed data transformation as compared with existing LTEs, the NR NB can have a bandwidth equal to or greater than the existing maximum bandwidth and a beam forming technology can additionally be implemented by using orthogonal frequency division multiplexing (OFDM). Also, adaptive modulation & coding (AMC) to determine a modulation scheme and a channel coding rate adaptive to the channel state of the UE is applied.

According to certain embodiments, a NR CN (2c-05) functions to support mobility and set up bearer and QoS, etc. The NR CN is a device providing a variety of controls as well as mobility management for the UE and is connected to a number of base stations. Also, the next generation mobile communication system can be associated with the existing LTE system, and the NR CN is connected to MME (2c-25) via a network interface. MME is connected to eNB (2c-30) which is an existing base station.

Figure 2D:
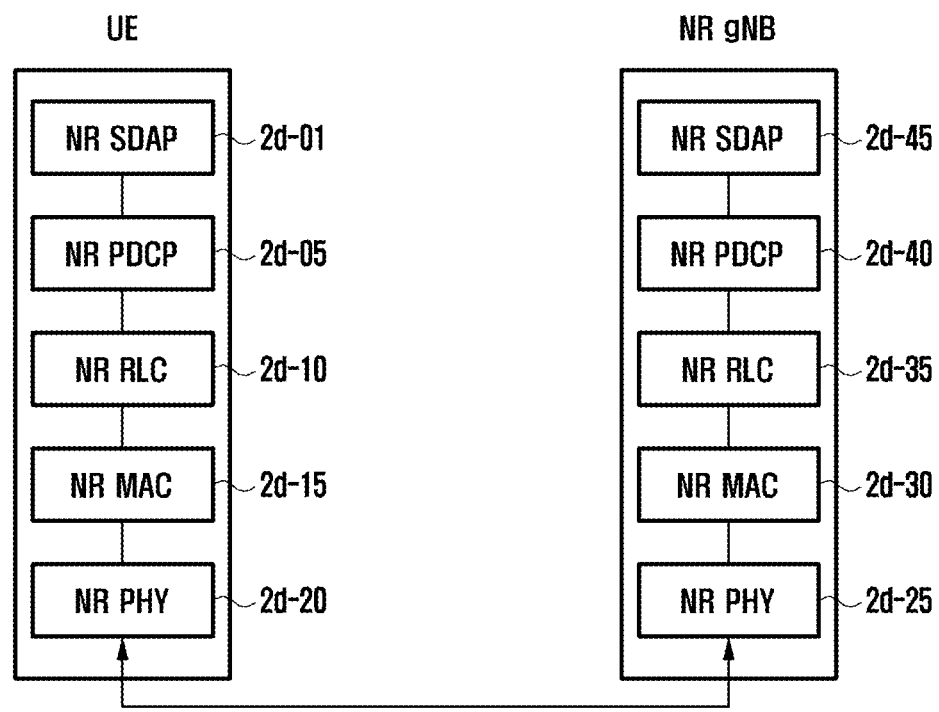
FIG. 2D illustrates an example of a wireless protocol structure of the next generation mobile communication system according to some embodiments of this disclosure.

FIG. 2D illustrates an example of a wireless protocol structure of the next generation mobile communication system according to various embodiments of this disclosure.

Referring to the explanatory example of FIG. 2D, a wireless protocol of the next generation mobile communication system includes NR SDAP(2d-01, 2d-45), NR PDCP (2d-05, 2d-40), NR RLC(2d-10, 2d-35), and NR MAC(2d-15, 2d-30) at UE and NR base station respectively.

Functions of the NR SDAP (2d-01, 2d-45) comprise one or more of the following:
 Transfer of user plane data
 Mapping between a QoS flow and a DRB for both DL and UL
 Marking QoS flow ID in both DL and UL packets
 Reflective QoS flow to DRB mapping for the UL SDAP PDUs With respect to an SDAP layer device, a UE can receive setup as to whether to use a header of the SDAP layer device by each PDCP layer device, each bearer, or each logical channel, or to use a function of the SDAP layer device, by means of the RRC message. Where the SDAP header is set, the SDAP layer device can instruct the UE to update or reset QoS flows of the uplink and the downlink and mapping information for data bearer by a 1-bit NAS reflective QoS indicator and a 1-bit AS reflective QoS indicator of the SDAP header. The SDAP header may include QoS flow ID information representing QoS. The QoS information may be used as data processing priority, scheduling information, etc. to assist in smooth services.

Functions of NR PDCP (2d-05, 2d-40) can include one or more of the following:
 Header compression and decompression: ROHC only
 Transfer of user data
 In-sequence delivery of upper layer PDUs
 Out-of-sequence delivery of upper layer PDUs
 PDCP PDU reordering for reception
 Duplicate detection of lower layer SDUs
 Retransmission of PDCP SDUs
 Ciphering and deciphering
 Timer-based SDU discard in uplink Reordering function of the NR PDCP device is a function to sequentially reorder PDCP PDUs received by the lower layer based on PDCP SN (sequence number). This function may include a function to transmit data to the upper layer in the reordered sequence or to directly transmit data without considering the sequence, and a function to record lost PDCP PDUs by reordering the sequence thereof. In addition, functions to report states of the lost PDCP PDUs to the transmitter, and to request retransmission of the lost PDCM PDUs may be included.

Functions of NR RLC (2d-10, 2d-35) include one or more of the following:
  Transfer of upper layer PDUs
  In-sequence delivery of upper layer PDUs
  Out-of-sequence delivery of upper layer PDUs
  Error Correction through ARQ
  Concatenation, segmentation and reassembly of RLC SDUs
  Re-segmentation of RLC data PDUs
  Reordering of RLC data PDUs
  Duplicate detection
  Protocol error detection
  RLC SDU discard
  RLC re-establishment Referring to the illustrative example of FIG. 2d, in-sequence delivery of the NR RLC device is a function to transmit RLC SDUs received from the lower layer to the upper layer in sequence, originally where one RLC SDU is segmented into several RLC SDUs and the segmented RLC SDUs are received, a function to reassemble and transmit the received RLC PDUs may be included. A function to reorder the received RLC PDUs based on RLC SN or PDCP SN, a function to reorder the sequence of the received RLC PDUs and record lost RLC PDUs, a function to report the states of the lost RLC PDUs to the transmitter, and a function to request retransmission of the lost RLC PDUs may also be included. Where there is any lost RLC SDU, a function to transmit only the RLC SDUs prior to the lost RLC SDU to the upper layer in sequence may be included. In certain embodiments, where a predetermined timer expires even though there is any lost RLC SDU, a function to transmit all the RLC SDUs received before the timer starts to the upper layer in sequence may be included. Where a predetermined timer expires even though there is any lost RLC SDU, a function to transmit all the RLC SDUs received up to now to the upper layer in sequence may be included. Also, the RLC PDUs may be processed in the order as they are received (in the order as arrived, without regard to the sequence of serial numbers, sequence numbers, etc.) and delivered to the PDCP device without regard to the sequence (out-of sequence delivery). In case of segments, segments are stored in a buffer or segments to be received later are received and thereafter they are reconstructed into a complete single RLC PDU, which is then processed and delivered to the PDCP device. The NR RLC layer may not include a function of concatenation, or this function may be performed at the NR MAC layer or substituted for a multiplexing function of the NR MAC layer.

According to certain embodiments, an out-of sequence delivery function of the NR RLC device is a function to deliver the RLC SDUs received from the lower layer directly to the upper layer without regard to the sequence thereof. Where an originally single RLC SDU is segmented into several RLC SDUs and the segmented RLC SDUs are received, a function to reassemble them may be included. A function to store RLC SNs or PDCP SNs of the received RLC PDUs and order them in sequence, and record lost RLC PDUs may also be included.

Referring to the non-limiting example of FIG. 2D, NR MAC (2d-15, 2d-30) can be connected to several NR RLC layer devices included in a UE. Functions of an NR MAC include one or more of the following:
  Mapping between logical channels and transport channels
  Multiplexing/demultiplexing of MAC SDUs
  Scheduling information reporting
  Error correction through HARQ
  Priority handling between logical channels of one UE
  Priority handling between UEs by means of dynamic scheduling
  MBMS service identification
  Transport format selection
  Padding According to various embodiments, an NR PHY layer (2d-20, 2d-25) can operate channel coding and modulation of upper layer data, make them into OFDM symbols and transmit the OFDM symbols via a wireless channel, and demodulate the OFDM symbols received via the wireless channel, operate channel-decoding thereof and transmit the decoded data to the upper link.

Figure 2E:
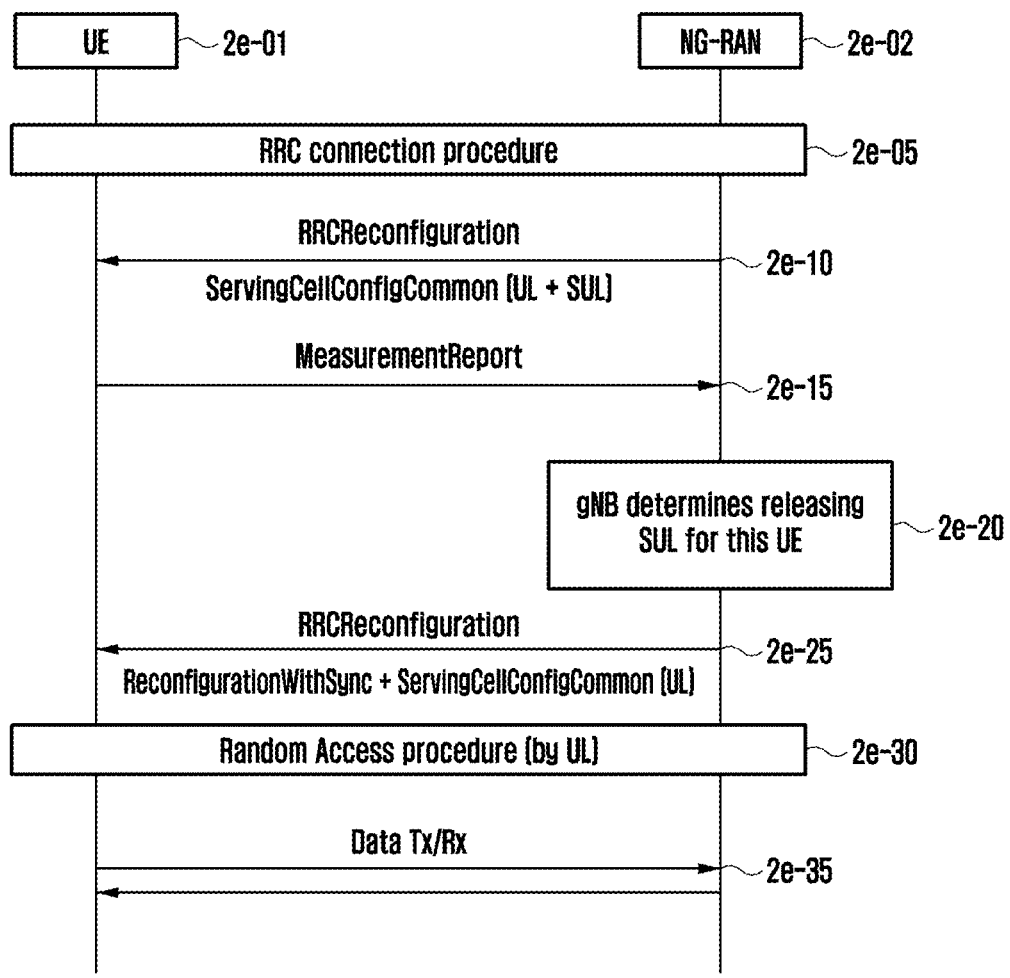
FIG. 2E illustrates an example of procedures by which a base station transmits cell-based uplink configuration to the UE and thereafter release the specific uplink configuration, according to various embodiments of this disclosure.

FIG. 2E illustrates an example of procedures by which a base station transmits cell-based uplink configuration to the UE and thereafter releases the specific uplink configuration, according to various embodiments of this disclosure.

Referring to the non-limiting example of FIG. 2E, UE (2e-01) in an RRC IDLE state is camped on after passing through a cell selection procedure for a specific base station (2e-02) and can receive system information. Thereafter, the UE performs an RRC connection procedure with the concerned cell in operation 2e-05 and the UE in the RRC connection state is shifted to the concerned cell. According to various embodiments, at operation 2e-10, a base station delivers an RRCReconfiguration message to the UE and provides configuration information applied to the UE in the concerned cell. The message may include, in particular, ServingCellConfigCommon, which is the basic information in the concerned serving cell, and ServingCellConfig configuration information which is specific information based on UE in the concerned cell. In particular, if the base station supports the concerned cell, configuration information for a normal uplink (hereinafter referred to as "NUL") and a supplementary uplink (hereinafter referred to as "SUL") may be included in in the ServingCellConfigCommon. The concerned configuration information is configuration information delivered to all UEs in the cell if the base station supports them on a cell basis. An example of ASN.1 code for implementing the above-described functionality is provided below:

```
ServingCellConfigCommon ::=            SEQUENCE {
    physCellId           PhysCellId                                                OPTIO
NAL, -- Cond HOAndServCellAdd,
    downlinkConfigCommon                       DownlinkConfigCommon
            OPTIONAL, -- Cond InterFreqHOAndServCellAdd
    uplinkConfigCommon                         UplinkConfigCommon
        OPTIONAL, -- Need M
    supplementaryUplinkConfig                  UplinkConfigCommon
        OPTIONAL, -- Need S
    n-TimingAdvanceOffset                      ENUMERATED { n0, n25600, n39936 }
                                OPTIONAL,-- Need S
    ssb-PositionsInBurst         CHOICE {
        shortBitmap              BIT STRING (SIZE (4)),
        mediumBitmap                           BIT STRING (SIZE (8)),
        longBitmap               BIT STRING (SIZE (64))
    }                                                              OPTIONAL, --
```

```
Cond AbsFreqSSB
        ssb-periodicityServingCell                              ENUMERATED { ms5, ms10, ms20,
ms40, ms80, ms160, spare2, spare1 }                             OPTIONAL, -- Need S
        dmrs-TypeA-Position                                     ENUMERATED {pos2, pos3},
        lte-CRS-ToMatchAround                                       SetupRelease { RateMatchPatternLTE-
CRS }                                    OPTIONAL, -- Need M
            rateMatchPatternToAddModList                                SEQUENCE      (SIZE
(1..maxNrofRateMatchPatterns)) OF RateMatchPattern              OPTIONAL, -- Need N
            rateMatchPatternToReleaseList                               SEQUENCE      (SIZE
(1..maxNrofRateMatchPatterns)) OF RateMatchPatternId            OPTIONAL, -- Need N
        subcarrierSpacing                                       SubcarrierSpacing
OPTIONAL, -- Need S
                    tdd-UL-DL-ConfigurationCommon                                     TDD-UL-DL-
ConfigCommon                                                    OPTIONAL, -- Cond TDD
        ss-PBCH-BlockPower                                      INTEGER (-60..50),
        ...
}
```

SupplementaryUplinkConfig

According to certain embodiments, this field is optionally present if UplinkConfigcomon is set but is not present in any other cases. Where this field is not present, the UE releases SupplementaryUplinkConfig if set in ServingCellConfig.

Also, in some embodiments, the ServingCellConfigCommon may be included when it is delivered to a target cell from the previous cell at the time of handover. In this case, where the UE having received support of NUL (normal UL) and SUL (supplementary UL) in the previous serving cell is handed over to a serving cell which supports only NUL, the configuration information for SUL may be released. That is, the supplementaryUplinkConfg is discarded from the ServingCellConfigCommon, the UE releases SUL configuration information.

However, under current standards, serving cells support both NUL and SUL, and there is no function to set only one UL for a specific UE. That is, where the UE is isolated from a cell edge (moves to the center of a cell), SUL configuration is not required, and support for more features may be wanted. Also, where SUL is set, as capability limitation (for example, limitation to UL MIMO, etc.) may be applied to the UE, and thus, more UE capability and wireless features can be used if NUL is solely set than in the case of NUL+SUL configuration. The non-limiting example of ASN.1 code shown below indicates that current standards cannot release SUL for a specific UE. That is, a SupplementaryUplink field is set to OPTIONAL NEED M in the ASN.1 code. This means that where the concerned filed is discarded and delivered in the next configuration, if there is a value set previously, the previous value is maintained. That is, although NUL and SUL are simultaneously set in the previous RRC configuration, and SUL is discarded and delivered in the next configuration, it does not mean release of SUL.

```
            ServingCellConfig ::=                               SEQUENCE {
                    tdd-UL-DL-ConfigurationDedicated                              TDD-UL-DL-
ConfigDedicated                                                 OPTIONAL, -- Cond TDD
                            initialDownlinkBWP                                    BWP-
DownlinkDedicated                                               OPTIONAL, -- Need M
                    downlinkBWP-ToReleaseList                                     SEQUENCE     (SIZE
(1..maxNrofBWPs)) OF BWP-Id                                     OPTIONAL, -- Need N
                    downlinkBWP-ToAddModList                                      SEQUENCE     (SIZE
(1..maxNroflWPs)) OF BWP-Downlink                               OPTIONAL, -- Need N
                            firstActiveDownlinkBWP-Id                             BWP-
Id                                                              OPTIONAL, -- Cond SyncAndCellAdd
                    bwp-InactivityTimer                         ENUMERATED {ms2, ms3, ms4, ms5,
ms6, ms8, ms10, ms20, ms30,
                                                                            ms40,ms50, ms60, ms80,ms100,
ms200,ms300, ms500,
                                                                            ms750, ms1280, ms1920, ms2560, spare10,
spare9, spare8,
                                                                            spare7, spare6, spare5, spare4, spare3, spare2,
spare1 }                                 OPTIONAL,              --Need R
                            defaultDownlinkBWP-Id                                 BWP-
Id                                                              OPTIONAL, -- Need S
                    uplinkConfig                                UplinkConfig
OPTIONAL, -- Need M
                            supplementaryUplink                 UplinkConfig
OPTIONAL, -- Need M
                            pdcch-ServingCellConfig                     SetupRelease {         PDCCH-
ServingCellConfig }                                             OPTIONAL, -- Need M
                            pdsch-ServingCellConfig                     SetupRelease {         PDSCH-
ServingCellConfig }                                             OPTIONAL, -- Need M
                    csi-MeasConfig                                      SetupRelease {         CSI-MeasConfig
}                                                               OPTIONAL, -- Need M
                    sCellDeactivationTimer                              ENUMERATED {ms20, ms40, ms80,
ms160, ms200, ms240,
                                                                            ms320, ms400, ms480, ms520, ms640,
ms720,
                                                                                    ms840,                ms1280,
```

```
spare2,spare1}                    OPTIONAL, -- Cond ServingCellWithoutPUCCH
                crossCarrierSchedulingConfig              CrossCarrierSchedulingConfig
                    OPTIONAL, -- Need M
                    tag-id                        TAG-Id,
                        ue-BeamLockFunction                                ENUMERATED
{enabled}                                         OPTIONAL, -- Need R
                    pathlossReferenceLinking              ENUMERATED          {pCell,
sCell}                                OPTIONAL, -- Cond SCellOnly
                servingCellMO                     MeasObjectId
    OPTIONAL, -- Cond MeasObject
                    ...,
                    [[
                    lte-CRS-ToMatchAround                 SetupRelease        { RateMatchPatternLTE-
CRS }                                 OPTIONAL, -- Need M
                        rateMatchPatternToAddModList                          SEQUENCE        (SIZE
(1..maxNrofRateMatchPatterns)) OF RateMatchPattern              OPTIONAL, -- Need N
                            rateMatchPatternToReleaseList         SEQUENCE                    (SIZE
(1..maxNrofRateMatchPatterns)) OF RateMatchPatternId            OPTIONAL, -- Need N
                            downlinkChannelBW-PerSCS-List         SEQUENCE (SIZE (1..maxSCSs))
OF SCS-SpecificCarrier                            OPTIONAL -- Need S
                    ]]
        }
```

Referring to the non-limiting example of FIG. 2E, at operation 2e-15, the UE can measure serving cells and cells of the serving frequency, and cells of peripheral frequency and other RAT according to the measurement procedure, and includes the measurement results in a measurement reporting message so as to be then delivered to the base station. In operation 2e-20, the base station interprets information of the received measurement report of the UE and can know that the current cell is not present in the cell edge but is present near the center of the serving cell. That is, this may be a case where the serving cell measurement value of the UE is good. In this case, the base station can determine to release SUL having been set for the concerned UE. This is to allow the UE to use more UE capability and provide more wireless resources.

In operation 2e-25, the base station includes ReconfigurationWithSync and ServingCellConfigCommon including configuration information only for the uplink (NUL) in an RRCReconfiguration message and can deliver the message to the UE. According to this configuration information, the UE is instructed to re-perform synchronous configuration via random access, release SUL configuration from the concerned cell, and apply only the NUL configuration. In operation 2e-30, the UE applies the configuration for the set NUL, performs a random access procedure for the concerned cell, and obtains uplink and downlink synchronization. In operation 2e-35, the UE performs data transmission and reception with the base station. In this case, the new configuration value received in operation 2e-25 is applied, SUL configuration is released, and communication is conducted by applying only NUL.

In particular, the disclosure features that SUL is not set for a specific UE although the concerned serving sell supports both NUL and SUL. Under current standards, cell-based uplink configuration information is continuously provided from ServingCellConfigCommon and ServingCellConfig-CommonSIB according to the support thereof by the cell. However, if the disclosure is applied, SUL configuration information may be absent for a specific UE, separately from the cell capability. If the base station delivers ServingCell-ConfigCommon from which SUL configuration is discarded, together from ReconfigurationWithSync, the UE releases the SUL configuration information present in ServingCell-Config, which is a dedicated RRC message.

In certain embodiments, even though the UE receives again SIM (that is, both NUL and SUL configurations are included in ServingCellConfigCommonSIB) supplied from the base station after having performed the concerned procedure, the SUL cannot be used again because SUL configuration information included in the dedicated message has been released. Currently, ReconfigurationWithSync configuration is used in a case of changing PCell (handover), in which the most important system information in the target cell can be included. The disclosure features that if the disclosure is applied, a method of using Reconfiguration-WithSync is applied for a cell-based UE.

Figure 2F:
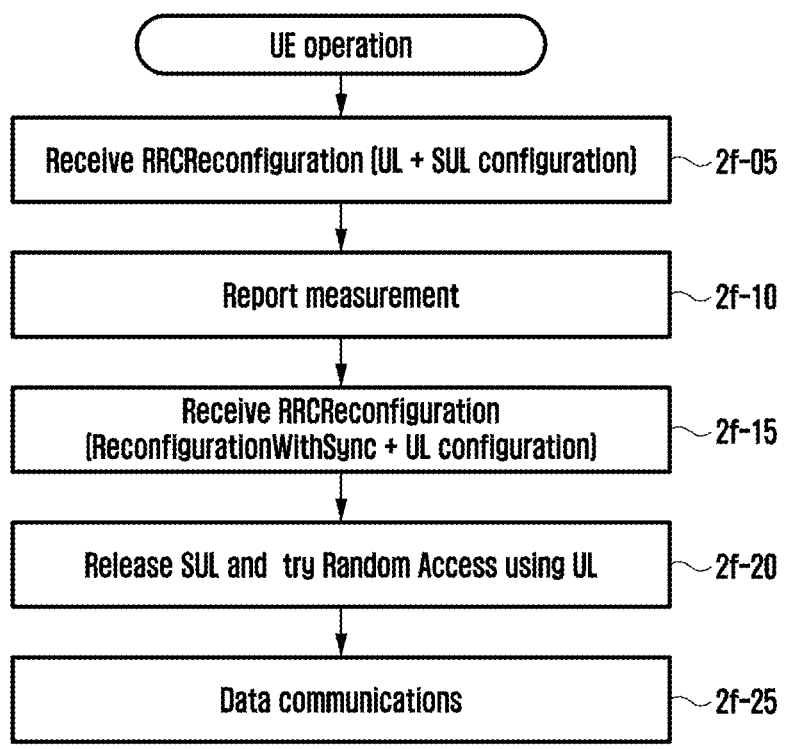
FIG. 2F illustrates an example of operations by the UE when release of the UE-based uplink in a specific cell is applied, according to some embodiments of this disclosure.

FIG. 2F illustrates an example of operations by the UE when release of the UE-based uplink in a specific cell is applied, as provided in the disclosure.

Referring to the non-limiting example of FIG. 2F, a UE in a RRC IDLE state is camped on after passing through a cell selection procedure for a specific base station, and can receive system information. Thereafter, the UE performs an RRC connection procedure with the concerned cell and is shifted to the concerned cell in the RRC connection state. In operation 2f-05, the UE receives an RRCReconfiguration message from the base station and receives configuration information applied to the UE in the concerned cell. The message may include ServingCellConfigCommon which is the basic information in the concerned cell and ServingCell-Config configuration information which is specific information based on the UE. In particular, if the base station supports the concerned cell, configuration information for the normal uplink (NUL) and the supplementary uplink (SUL) may be included in ServingCellConfigCommon. The concerned configuration information is configuration information delivered to all UEs in the cell if supported by the base station on a cell basis.

According to certain embodiments, at operation 2f-10, the UE can measure serving cells, cells of serving frequencies, and cells of peripheral frequencies and other RAT cells according to the measurement procedure. In operation 2f-15, the UE can receive an RRCReconfiguration message delivered from the base station, and ReconfigurationWithSync and ServingCellConfigCommon having only the uplink configuration information can be included in the concerned message. According to this configuration information, the UE is instructed to re-perform synchronous configuration via random access, release SUL configuration from the concerned cell, and apply only the NUL configuration. In operation 2f-20, the UE applies the configuration for the set NUL, performs a random access procedure for the concerned cell, and obtains uplink and downlink synchronization. In operation 2f-25, the UE performs data transmission and reception with the base station. In this case, the new configuration value received in operation 2f-15 is applied, SUL configuration is released, and communication is conducted by applying only NUL.

Figure 2G:
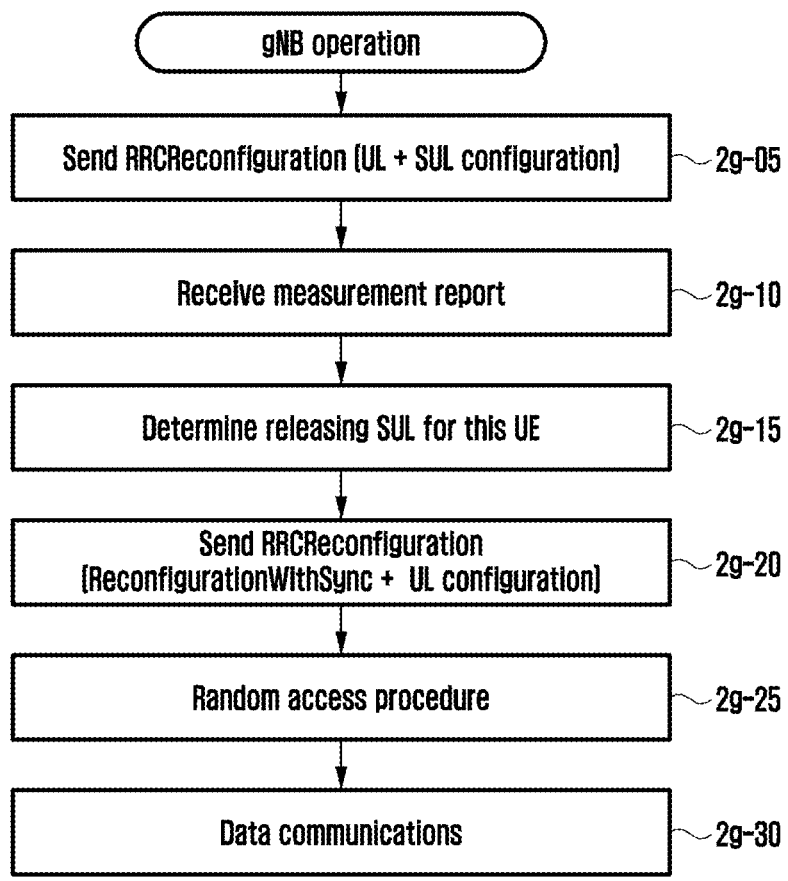
FIG. 2G illustrates an example of operations by the base station when a method to release the UE-based uplink in a specific cell is applied, according to certain embodiments of this disclosure.

FIG. 2G illustrates an example of operations by the base station when a method to release the UE-based uplink in a specific cell is applied, according to various embodiments of this disclosure.

Referring to the non-limiting example of FIG. 2G, a UE in an RRC IDLE state is camped on after passing through the cell selection procedure for a specific base station and performs an RRC connection procedure with the concerned cell after having received the system information. The base station shifts the concerned UE to the RRC connection state. In operation 2g-05, the base station delivers an RRCReconfiguration message to the UE and provides configuration information applied to the UE in the concerned cell. The message may include, in particular, ServingCellConfigCommon which is the basic information in the concerned serving cell and ServingCellConfig configuration information which is specific information based on UE in the concerned cell. In particular, if the base station supports the concerned cell, configuration information for a normal uplink (hereinafter referred to as "NUL") and a supplementary uplink (hereinafter referred to as "SUL") may be included in the ServingCellConfigCommon. The concerned configuration information is configuration information delivered to all UEs in the cell if the base station supports them on a cell basis.

According to certain embodiments, at operation 2g-10, the base station receives a measurement report delivered by the UE. The measurement report may include measurement values of serving cells, cells of serving frequency, and cells of peripheral frequency and other RATs according to the measurement procedure. In operation 2g-15, the base station interprets information of the received measurement of the UE and can know that the current UE is not present in the cell edge but is present near the center of the serving cell. That is, this may be a case where the measurement value for the serving cell of the UE is good. In this case, the base station can determine to release SUL set for the concerned UE. This is to allow the UE to use more UE capability and to provide more wireless resources.

In operation 2g-20, the base station sets an RRCREconfiguration message and delivers the message to the UE for configuring the UE with determination at the above operation. The concerned message may include ReconfigurationWithSync and ServingCellConfigCommon having only the uplink (NUL) configuration information. According to this configuration information, the UE is instructed to re-perform synchronous configuration via random access, release SUL configuration from the concerned cell, and apply only the NUL configuration. In operation 2g-25, the UE applies the configuration for the set NUL and performs a random access procedure for the concerned cell, and the base station performs the concerned random access procedure. In operations 2f-30, the base station and the UE perform data transmission and reception.

Figure 2H:
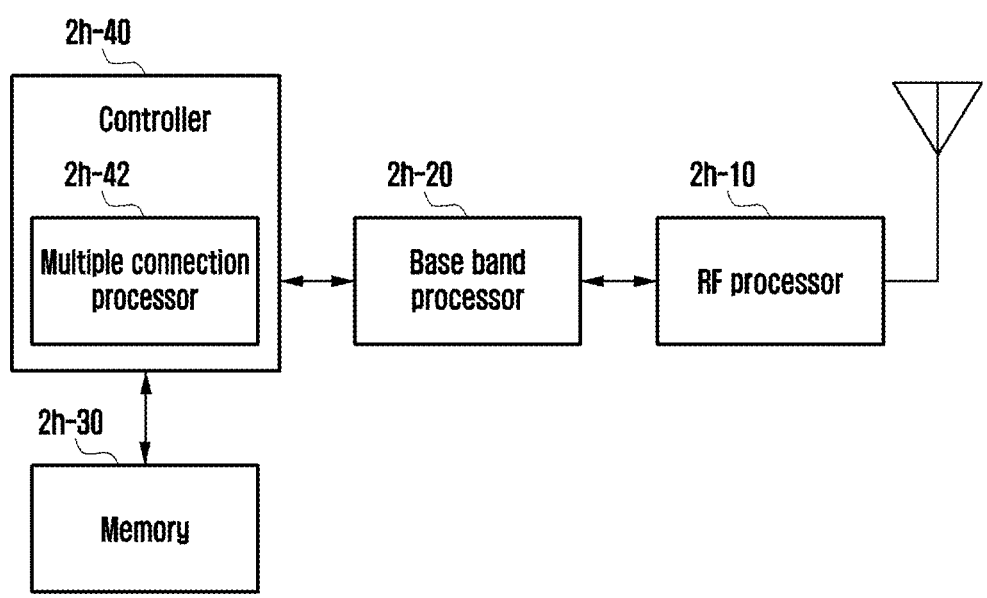
FIG. 2H illustrates, in block diagram format, an example of an internal structure of the UE according to various embodiments of this disclosure.

FIG. 2H illustrates, in block diagram format, an example of an internal structure of the UE according to certain embodiments of this disclosure.

Referring to the non-limiting example of FIG. 2H, a UE includes an RF (radio frequency) processor (2h-10), a baseband processor (2h-20), a storage (2h-30), and a controller (2h-40).

According to various embodiments RF processor (2h-10) performs a function to transceive signals for band conversion of the signal, amplification, etc. via a wireless channel. That is, the RF processor (2h-10) performs upward transformation of a baseband signal provided from the baseband processor (2h-20) into an RF band signal and thereafter transmits the RF band signal through an antenna, and performs downward transformation of the RF band received through the antenna signal into a baseband signal. For example, the RF processor (2h-10) may include a transmission filter, a reception filter, an amplifier, a mixer, an oscillator, a DAC (digital to analog convertor), an ADC (analog to digital convertor), etc. FIG. 2H shows only one antenna, but the UE may be provided with a plurality of antennas. Also, the RF processor (2h-10) may include a plurality of RF chains. Further, the RF processor (2h-10) can perform beamforming. For the beamforming, the RF processor (2h-10) can adjust phases and sizes of respective signals transceived through the plurality of antennas or antenna elements. Also, the RF processor can perform MIMO and can receive plural layers when the MIMO operation is performed.

According to some embodiments, baseband processor (2h-20) performs transformation between baseband signal and bitstream according to the physical layer specification of the system. For example, when data is transmitted, the baseband processor (2h-20) encodes and modulates the transmitted bitstream, thereby generating complex symbols. Also when data is received, the baseband processor (2h-20) demodulates and decodes the baseband signal provided from the RF processor (2h-10), thereby restoring the received bitstream. For example, according to the OFDM (orthogonal frequency division multiplexing) method, when data is transmitted, the baseband processor (2h-20) encodes and modulates the transmitted bitstream, thereby generating complex symbols. After mapping the complex symbols with subcarriers, the baseband processor (2h-20) constructs OFDM symbols through IFFT (inverse fast Fourier transform) operation and CP (cyclic prefix) insertion. Also when data is received, the baseband processor (2h-20) segments the baseband signal provided from the RF processor (2h-10) in the unit of OFDM symbols. After restoring signals mapped with the subcarriers through FFT (fast Fourier transform) operation, the baseband processor (2h-20) restores the received bitstream through demodulation and decoding.

As described above, the baseband processor (2h-20) and the RF processor (2h-10) transceive signals. Accordingly, the baseband processor (2h-20) and the RF processor (2h-10) may be referred to as a transmitter, a receiver, a transceiver or a communicator. Further, at least one of the baseband processor (2h-20) and the RF processor (2h-10) may include a plurality of communication modules so as to support a number of different wireless connection technologies. Also, at least one of the baseband processor (2h-20) and the RF processor (2h-10) may include the different communication modules so as to process signals of different frequency bands. For example, the different wireless connection technologies may include wireless LAN (e.g., IEEE 802.11), cellular network (e.g., LTE), etc. Also, the different frequency bands may include super high frequency (SHF) (e.g., 2·NRHz, NRhz) bands and millimeter (MM) wave (e.g., 60 GHz) bands.

As shown in the illustrative example of FIG. 2H, storage (2h-30) stores basic programs for operation of the UE, application programs and data such as configuration information. The storage (2h-30) may store information associated with a second connection node that performs wireless communication by use of a second wireless connection technology. Also, the storage (2h-30) provides the stored data according to request from the controller (2h-40).

The controller (2h-40) controls general operations of the UE. For example, the controller (2h-40) transceives signals through the baseband processor (2h-20) and the RF processor (2h-10). Also, the controller (2h-40) records data on the storage (2h-30) and reads the data. For this, the controller (2h-40) may include at least one processor. For example, the controller (2h-40) may include a CP (communication processor) that performs control for communication and an AP (application processor) that controls upper layers such as application programs.

Figure 2I:
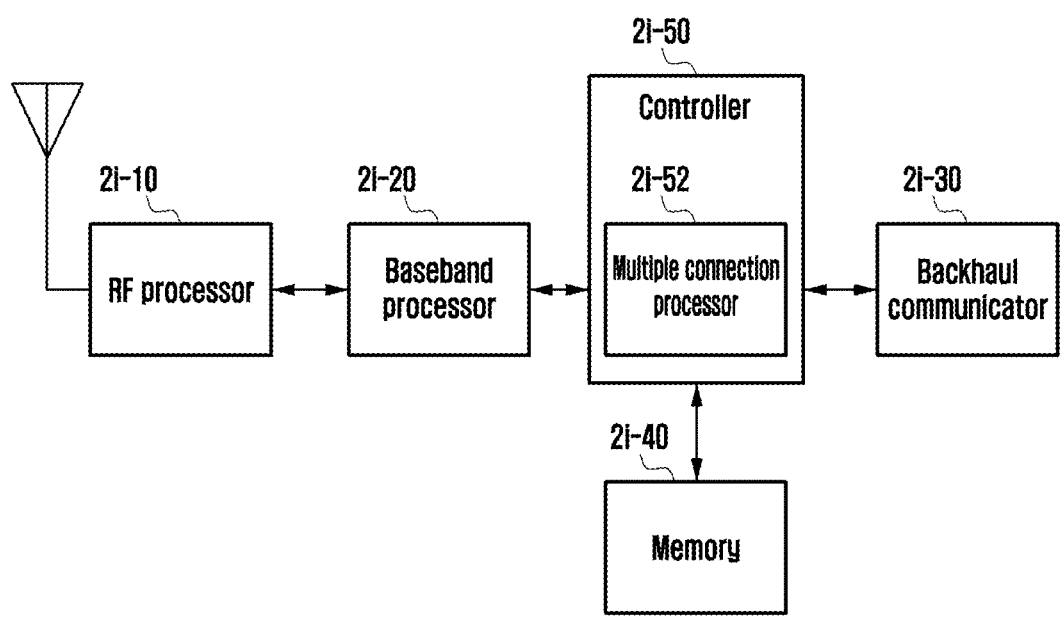
FIG. 2I illustrates, in block diagram format, an example of a configuration of the base station according to certain embodiments of this disclosure.

FIG. 2I illustrates, in block diagram format, an example of a configuration of the base station according to various embodiments of this disclosure.

Referring to the non-limiting example of FIG. 2I, the base station includes an RF processor (2i-10), a baseband processor (2i-20), a backhaul communicator (2i-30), a storage (2i-40), and a controller (2i-50).

In certain embodiments, the RF processor (2i-10) functions to transceive signals for band change of signals and amplification, etc. via a wireless channel. That is, the RF processor (2i-10) performs upward transformation of a baseband signal provided from the baseband processor (2i-20) into an RF band signal and transmits the RF band signal through an antenna, and performs downward transformation of an RF band signal received through the antenna into a baseband signal. For example, the RF processor (2i-10) may include a transmission filter, a reception filter, an amplifier, a mixer, an oscillator, a DAC, an ADC, etc. In FIG. 2I, only one antenna is illustrated, but a first connection node may have a plurality of antennas. Also, the RF processor (2i-10) may include a plurality of RF chains. Further, the RF processor (2i-10) can perform beamforming. For the beamforming, the RF processor (2i-10) can adjust phases and sizes of respective signals transceived through the plurality of antennas or antenna elements. Also, the RF processor can perform downward MIMO operating by transmitting one or more layers.

In certain embodiments, baseband processor (2i-20) performs a transformation between the baseband signal and bitstream according to the physical layer specification of a first wireless connection technology. For example, when data is transmitted, the baseband processor (2i-20) encodes and modulates the transmitted bitstream, thereby generating complex symbols. Also when data is received, the baseband processor (2i-20) demodulates and decodes the baseband signal provided from the RF processor (2i-10), thereby restoring the received bitstream. For example, according to the OFDM (orthogonal frequency division multiplexing) method, when data is transmitted, the baseband processor (2i-20) encodes and modulates the transmitted bitstream, thereby generating complex symbols. After mapping the complex symbols with subcarriers, the baseband processor (2i-20) constructs OFDM symbols through IFFT (inverse fast Fourier transform) operation and CP (cyclic prefix) insertion. Also when data is received, the baseband processor (2i-20) segments the baseband signal provided from the RF processor (2i-10) in the unit of OFDM symbols. After restoring signals mapped with the subcarriers through a FFT (fast Fourier transform) operation, the baseband processor (2i-20) restores the received bitstream through demodulation and decoding. As described above, the baseband processor (2i-20) and the RF processor (2i-10) transceive signals. Accordingly, the baseband processor (2i-20) and the RF processor (2i-10) may be referred to as a transmitter, a receiver, a transceiver, a communicator or a wireless communicator.

According to various embodiments, backhaul communicator (2i-30) provides an interface for performing communication with other nodes in the network. That is, the backhaul communicator (2i-30) transforms bitstream transmitted from a primary base station to any other node, for example, to a supplementary base station, a core network, etc. into physical signals, and physical signals received from the other node are transformed into bitstream.

The storage (2i-40) stores basic programs for operation of the primary base station, application programs and data such as configuration information. In particular, the storage (2i-40) may store information associated with a bearer allotted to the connected UE, measurement results reported from the connected UE, etc. Also, the storage (2i-40) may provide multiple connection to the UE or store information that can be a basis to determine interruption of the connection. The storage (2i-40) also provides stored data at the request from the controller (2i-50).

The controller (2i-50) controls general operations of the primary base station. For example, the controller (2i-50) transceives signals through the baseband processor (2i-20) and the RF processor (2i-10) or the backhaul communicator (2i-30). Also, the controller (2i-50) records data on the storage (2i-40) and reads the data. For this, the controller (i-50) may include at least one processor.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) in a communication system, the method comprising:

identifying a manufacturer assigned radio capability identifier (ID) and a first public land mobile network (PLMN) assigned radio capability ID for a current PLMN which are stored in the UE;

transmitting, to an access and mobility management function (AMF), a registration request message including a first UE radio capability ID based on the identification, wherein the first UE radio capability ID includes the first PLMN assigned radio capability ID for the current PLMN;

receiving, from a base station, a request message for requesting UE capability information;

transmitting, to the base station, a message including the UE capability information, as a response to the requested message; and receiving, from the AMF, a registration accept message including a second UE radio capability ID, as a response to the registration request message, wherein the second UE radio capability ID includes a second PLMN assigned ID configured in the AMF based on the UE capability information.

2. The method of claim 1, further comprising:

storing the second UE radio capability ID with the UE capability information, wherein the UE capability information includes radio capability of the UE for at least one radio access technology (RAT) type.

3. The method of claim 1, further comprising:

identifying whether a size of the registration accept message exceeds a predetermined size; and in case that the size of the registration accept message exceeds the predetermined size, performing a segmentation for the registration accept response message, wherein the registration accept message is transmitted by at least one segmented radio resource control (RRC) message.

4. The method of claim 1, wherein the registration accept message further includes an indicator, in case that the UE capability information does not correspond to manufacturer based capability, and wherein the registration accept message further includes the first UE radio capability ID, in case that the UE capability information corresponds to the manufacturer based capability.

5. A method performed by an access and mobility management function (AMF) in a communication system, the method comprising:

receiving, from a user equipment (UE), a registration request message including a first UE radio capability identifier (ID), wherein the first UE radio capability ID includes a first public land mobile network (PLMN) assigned radio capability ID for a current PLMN of the UE which is stored in the UE;

determining that UE capability information for the first UE radio capability ID is not identified;

transmitting, to a base station, a message to request the UE capability information, based on the determination;

receiving, from a base station, the UE capability information for the UE as a response to the message;

configuring a second UE radio capability ID based on the UE capability information; and transmitting, to the UE, a registration accept message including the second UE radio capability ID, as a response for the registration request message, wherein the second UE radio capability ID includes a second PLMN assigned ID.

6. The method of claim 5, further comprising:

obtaining the second UE radio capability ID based on the UE capability information; and storing the UE capability information with the second UE radio capability ID.

7. The method of claim 5, wherein the first UE radio capability ID further includes a manufacturer assigned radio capability ID, and wherein the UE capability information includes radio capability of the UE for at least one radio access technology (RAT) type.

8. The method of claim 5, wherein the UE capability information is received with an indicator, in case that the UE capability information does not correspond to manufacturer based capability, and wherein the UE capability information is received with the first UE radio capability ID, in case that the UE capability information corresponds to the manufacturer based capability.

9. A user equipment (UE) in a communication system, the UE comprising:

a transceiver; and a controller configured to:

identify a manufacturer assigned radio capability identifier (ID) and a first public land mobile network (PLMN) assigned radio capability ID for a current PLMN which are stored in the UE, control the transceiver to transmit, to an access and mobility management function (AMF), a registration request message including a first UE radio capability ID based on the identification, wherein the first UE radio capability ID includes the first PLMN assigned radio capability ID for the current PLMN, control the transceiver to receive, from a base station, a request message for requesting UE capability information, control the transceiver to transmit, to the base station, a message including the UE capability information, as a response to the request message, and control the transceiver to receive, from the AMF, a registration accept message including a second UE radio capability ID, as a response to the registration request message, wherein the second UE radio capability ID includes a second PLMN assigned ID configured in the AMF based on the UE capability information.

10. The UE of claim 9, wherein the controller is further configured to store the second UE radio capability ID with the UE capability information, and wherein the UE capability information includes radio capability of the UE for at least one radio access technology (RAT) type.

11. The UE of claim 9, wherein the controller is further configured to identify whether a size of the registration accept message exceeds a predetermined size, in case that the size of the registration accept message exceeds the predetermined size, perform a segmentation for the registration accept message, and wherein the registration accept message is transmitted by at least one segmented radio resource control (RRC) message.

12. The UE of claim 9, wherein the registration accept message further includes an indicator, in case that the UE capability information does not correspond to manufacturer based capability, and wherein the registration accept message further includes the first UE radio capability ID, in case that the UE capability information corresponds to the manufacturer based capability.

13. An access and mobility management function (AMF) in a communication system, the AMF comprising:

a transceiver; and a controller configured to:

control the transceiver to receive, from a user equipment (UE), a registration request message including a first UE radio capability identifier (ID), wherein the first UE radio capability ID includes a first public land mobile network (PLMN) assigned radio capability ID for a current PLMN of the UE which is stored in the UE, determine that UE capability information for the first UE radio capability ID is not identified, control the transceiver to transmit, to a base station, a message to request the UE capability information, based on the determination, control the transceiver to receive, from a base station, the UE capability information for the UE as a response to the message, configure a second UE radio capability ID based on the UE capability information, and control the transceiver to transmit, to the UE, a registration accept message including the second UE radio capability ID, as a response for the registration request message, wherein the second UE radio capability ID includes a second PLMN assigned ID.

14. The AMF of claim 13,
wherein the controller is further configured to obtain the second UE radio capability ID based on the UE capability information, and store the UE capability information with the second UE radio capability ID.

15. The AMF of claim 13,
wherein the first UE radio capability ID further includes a manufacturer assigned radio capability ID, and
wherein the UE capability information includes radio capability of the UE for at least one radio access technology (RAT) type.

16. The AMF of claim 13,
wherein the UE capability information is received with an indicator, in case that the UE capability information does not correspond to manufacturer based capability, and
wherein the UE capability information is received with the first UE radio capability ID, in case that the UE capability information corresponds to the manufacturer based capability.

* * * * *